(12) United States Patent
Zubieta Andueza

(10) Patent No.: US 11,279,441 B2
(45) Date of Patent: Mar. 22, 2022

(54) CHAIN-RINGS SET FOR A POWER TRANSMISSION SYSTEM PROVIDED WITH SEGMENTED CHAIN-RINGS IN DIFFERENT PLANES

(71) Applicant: ZUMA INNOVATION, S.L., Galdakao (ES)

(72) Inventor: Mikel Zubieta Andueza, Galdakao (ES)

(73) Assignee: ZUMA INNOVATION, S.L., Galdakao (ES)

( * ) Notice: Subject to any disclaimer, the term of this patent is extended or adjusted under 35 U.S.C. 154(b) by 391 days.

(21) Appl. No.: 16/306,867

(22) PCT Filed: Jun. 2, 2017

(86) PCT No.: PCT/EP2017/063580
§ 371 (c)(1),
(2) Date: Dec. 3, 2018

(87) PCT Pub. No.: WO2017/207810
PCT Pub. Date: Dec. 7, 2017

(65) Prior Publication Data
US 2021/0031877 A1 Feb. 4, 2021

(30) Foreign Application Priority Data
Jun. 3, 2016 (EP) .................................. 16382254

(51) Int. Cl.
*B62M 9/10* (2006.01)
*B62M 9/12* (2006.01)
*B62M 9/00* (2006.01)

(52) U.S. Cl.
CPC .............. *B62M 9/105* (2013.01); *B62M 9/12* (2013.01); *B62M 2009/005* (2013.01); *B62M 2009/007* (2013.01)

(58) Field of Classification Search
CPC .................................. B62M 9/08; B62M 9/10
(Continued)

(56) References Cited

U.S. PATENT DOCUMENTS

| 601,990 | A | * | 4/1898 | Suter | ....................... F16H 55/54 |
| | | | | | 474/47 |
| 2,368,147 | A | * | 1/1945 | Lapeyre | ................. B62M 9/131 |
| | | | | | 474/72 |

(Continued)

FOREIGN PATENT DOCUMENTS

| CH | 617992 A5 | 6/1980 |
| EP | 0474139 A1 | 3/1992 |

(Continued)

OTHER PUBLICATIONS

International Preliminary Report on Patentability dated Dec. 4, 2018 re: Application No. PCT/EP2017/063581, pp. 1-7, citing: WO 2016/033623 A1.

(Continued)

*Primary Examiner* — Henry Y Liu
(74) *Attorney, Agent, or Firm* — Cantor Colburn LLP

(57) ABSTRACT

Chain-rings set, for a power transmission system, which includes a chain, a first chain-ring, a second chain-ring where the first chain-ring is formed by a support part of the teeth and a teeth part, where the second chain-ring is formed by segments each formed by a support part of the teeth and a teeth part, which includes axial displacement means of the segments, where an up-shift segment of the segments has a first tooth which is the first which is engaged with the chain in the rotation movement, and where the displacement means are configured for moving the up-shift segment to an engaging position such that the first tooth can engage with an engaging link of the up-shift section of the chain, when the chain is engaged in the small chain-ring, and without the support part of the up-shift segment reaching the same plane (Continued)

than the support part of the first chain-ring, and to successively displace the other independent segments to an engaging position with the chain without the support parts of the independent segments reaching the same plane than the support part of the first chain-ring.

28 Claims, 14 Drawing Sheets

(58) Field of Classification Search
USPC .............................. 474/47, 48, 77, 80, 160
See application file for complete search history.

(56) References Cited

U.S. PATENT DOCUMENTS

| | | | | |
|---|---|---|---|---|
| 2,827,795 A * | 3/1958 | Caballeros | ............... | F16H 9/24 |
| | | | | 474/9 |
| 4,055,093 A * | 10/1977 | Ross | ............... | B62M 25/045 |
| | | | | 74/501.6 |
| 4,127,038 A * | 11/1978 | Browning | ............... | B62M 9/10 |
| | | | | 280/236 |
| 4,174,642 A * | 11/1979 | Martin | ............... | F16H 55/30 |
| | | | | 474/152 |
| 4,417,642 A * | 11/1983 | Suzuki | ............... | B60K 17/3467 |
| | | | | 180/249 |
| 4,580,997 A * | 4/1986 | Browning | ............... | B62M 9/14 |
| | | | | 474/160 |
| 4,592,738 A * | 6/1986 | Nagano | ............... | B62M 9/14 |
| | | | | 474/162 |
| 4,810,235 A * | 3/1989 | Husted | ............... | B62M 9/08 |
| | | | | 474/49 |
| 5,073,152 A * | 12/1991 | Browning | ............... | B62M 9/14 |
| | | | | 474/162 |
| 5,152,720 A * | 10/1992 | Browning | ............ | B62M 9/1242 |
| | | | | 474/80 |
| 5,205,794 A * | 4/1993 | Browning | ............... | B62M 9/14 |
| | | | | 474/160 |
| 5,354,243 A * | 10/1994 | Kriek | ............... | B62M 9/14 |
| | | | | 474/135 |
| 5,935,033 A * | 8/1999 | Tseng | ............... | B62M 9/105 |
| | | | | 474/116 |
| 5,970,816 A * | 10/1999 | Savard | ............... | B62M 25/02 |
| | | | | 74/489 |
| 6,267,699 B1* | 7/2001 | Gruich | ............... | F16H 55/52 |
| | | | | 474/49 |
| 6,325,734 B1* | 12/2001 | Young | ............... | F16H 7/06 |
| | | | | 474/156 |
| 6,431,573 B1* | 8/2002 | Lerman | ............... | B62M 9/14 |
| | | | | 280/261 |
| 6,749,531 B2* | 6/2004 | Kang | ............... | B62M 9/08 |
| | | | | 474/160 |
| 7,156,764 B2* | 1/2007 | Mercat | ............... | B62M 9/08 |
| | | | | 474/152 |
| 7,715,566 B2* | 5/2010 | Seo | ............... | H04H 20/20 |
| | | | | 381/2 |
| 7,749,117 B2* | 7/2010 | Carrasco Vergara | .... | B62M 9/08 |
| | | | | 474/152 |
| 8,092,329 B2* | 1/2012 | Wickliffe | ............... | F16H 55/303 |
| | | | | 474/160 |
| 8,096,908 B2* | 1/2012 | Oishi | ............... | B62M 9/10 |
| | | | | 474/160 |
| 8,753,236 B2* | 6/2014 | Wong | ............... | F16H 55/54 |
| | | | | 474/47 |
| 9,499,233 B2* | 11/2016 | Schuster | ............... | B62M 9/06 |
| 10,259,532 B2* | 4/2019 | Schuster | ............... | B62M 9/08 |
| 10,435,112 B2* | 10/2019 | Tetsuka | ............... | B62M 9/12 |
| 2002/0006842 A1* | 1/2002 | Tetsuka | ............... | B62M 9/10 |
| | | | | 474/160 |
| 2002/0084618 A1* | 7/2002 | Lerman | ............... | B62M 1/36 |
| | | | | 280/261 |
| 2008/0300096 A1 | 12/2008 | Wesling et al. | | |
| 2010/0137086 A1* | 6/2010 | Lin | ............... | B62M 9/105 |
| | | | | 474/160 |
| 2013/0267362 A1* | 10/2013 | Gheciu | ............... | B62M 9/08 |
| | | | | 474/80 |
| 2014/0013900 A1* | 1/2014 | Shiraishi | ............... | B62M 9/105 |
| | | | | 74/594.2 |
| 2014/0248982 A1* | 9/2014 | Schuster | ............... | B62M 9/14 |
| | | | | 474/69 |
| 2014/0303859 A1* | 10/2014 | Miki | ............... | B62M 25/08 |
| | | | | 701/60 |
| 2015/0191214 A1* | 7/2015 | Emura | ............... | B62M 9/06 |
| | | | | 74/594.2 |
| 2016/0101825 A1* | 4/2016 | Braedt | ............... | B62M 9/10 |
| | | | | 474/160 |
| 2017/0283006 A1* | 10/2017 | Schuster | ............... | B62M 1/36 |
| 2017/0355422 A1* | 12/2017 | Sugimoto | ............... | B62M 9/12 |

FOREIGN PATENT DOCUMENTS

| | | |
|---|---|---|
| EP | 0945335 A1 | 9/1999 |
| EP | 2602176 A1 | 6/2013 |
| GB | 1529166 A | 10/1978 |
| WO | 9804848 A2 | 2/1998 |
| WO | 2012009571 A1 | 1/2012 |
| WO | 2016033623 A1 | 3/2016 |

OTHER PUBLICATIONS

International Preliminary Report on Patentability dated Dec. 4, 2018 re: Application No. PCT/EP2017/063580, pp. 1-7, citing: WO 2012/009571 A1.
International Preliminary Report on Patentability dated Dec. 4, 2018, re: Application No. PCT/EP2017/063578, pp. 1-8, citing: WO 2012/009571 A1 and U.S. Pat. No. 5,935,033 A.
International Search Report dated Sep. 14, 2017 re: Application No. PCT/EP2017/063580, pp. 1-3, citing: WO 2012/009571 A1 and EP 0 474 139 A1.
International Search Report dated Aug. 24, 2017 re: Application No. PCT/EP2017/063581, pp. 1-4, citing: WO 2016/033623 A1, CH 617 992 A5, US 2014/248982 A1, US 2002/084618 A1, GB 1 529 166 A and US 2009/124440 A1.
International Search Report dated Aug. 3, 2017 re: Application No. PCT/EP2017/063578, pp. 1-4, citing: WO 2012/009571 A1, U.S. Pat. No. 5,935,033 A, CH 617 992 A5, U.S. Pat. No. 6,325,734 B1 and WO 98/04848 A2.
Written Opinion dated Aug. 24, 2017 re: Application No. PCT/EP2017/063581, pp. 1-6, citing: WO 2016/033623 A1.
Written Opinion dated Sep. 14, 2017 re: Application No. PCT/EP2017/063580, pp. 1-6, citing: WO 2012/009571 A1.
Written Opinion dated Aug. 3, 2017 re: Application No. PCT/EP2017/063578, pp. 1-7, citing: WO 2012/009571 A1 and U.S. Pat. No. 5,935,033 A.

* cited by examiner

CHAIN-RINGS SET FOR A POWER TRANSMISSION SYSTEM PROVIDED WITH SEGMENTED CHAIN-RINGS IN DIFFERENT PLANES

TECHNICAL FIELD

The present disclosure mainly belongs to the sector of the transmission sets for bicycles, and more specially relates to sets without derailleurs wherein the shifts of the chain between chain-rings are carried out displacing the segments from one of the chain-rings towards the general plane of an adjacent chain-ring. However, the disclosure can be applied to any other field wherein a smooth transition and with a continuous force transmission between different power transmission relations with a chain is advantageous.

BACKGROUND

Power transmission systems with several transmission ratios obtained by combining through a chain several gears of different size at the transmitting axis (chain-rings) and/or the transmitted axis (sprockets) are mainly used in the bicycle sector. For this reason, the evolution of chain transmission systems of several relations has been mainly linked to solve the particular issues of power transmission in bicycles.

On a bicycle, the force executed by the cyclist on the crank arms is transmitted through a chain-ring to the chain, and the latter transmits the force to the rear wheel through a sprocket. Bicycles usually have several chain-rings and sprockets of different sizes, so that, by combining different ones with the chain, multiple transmission ratios can be obtained and depending on these the rear wheel rotates at different speeds for a given rotational speed at the cranks. Pedalling is more comfortable and efficient at a certain cadence (rotational speed of the cranks), and having several chain-rings and sprockets allows, for example, using a small chain-ring and large sprocket combination when moving uphill in order to gear down the speed and to multiply the exerted force, and using a large chain-ring and small sprocket when moving downhill in order to multiply the rotational speed while decreasing the exerted force.

For a higher versatility of the bicycle, it is interesting to have a range of gear ratios as large as possible, as for efficiency and comfort care it is interesting to have small jumps between different gear ratios, so that it is possible to always have a transmission ratio in which the user can be pedaling close to the optimal or the most preferred cadence. Hence the interest of having the largest number of possible transmission ratios in a bicycle.

In the prior art, the chain displacement from one chainring (or sprocket) to another in order to engage a different transmission ratio is realized by derailleurs, which are basically pushing elements that can be controlled by one or several controls. The chain displacement from one chainring to a larger one can be broken down into different stages:

I. The shift starts with the derailleur pressing on the side of the chain, which "twists" the chain laterally towards the largest chain-ring. This "twisting" starts from the point where the tensioned chain leaves contact with the teeth of the smaller chain-ring, up to the point where the chain gets in contact with a tooth of the largest chain-ring.

II. The cranks rotate while the chain is simultaneously in contact with both chain-rings according to the previous position and while the derailleur keeps pressing on the chain, until the rotation is sufficient to allow contact between the tensioned chain and a second tooth in the larger chain-ring in a position closer to the engaging position due to being pushed by the derailleur.

III. As the chain-rings rotate, the chain gets in contact with different teeth on the larger chain-ring while the derailleur keeps pressing on the chain. At some stage the chain laterally surpasses the teeth of the larger chainring and progressively accommodates in the valleys of each tooth (because the step between teeth is larger at the tips than in the valleys due to the largest radius for the same angle). Eventually one of the chain rollers gets to an engaging position relative to one of the teeth of the larger chain-ring in which it is able to effectively transmit the force. In this moment it is considered that the shifting process has ended.

This sequence is illustrated for example in FIGS. 5A to 5F in document EP-0945335-A1. In FIG. 5A the chain is engaged in the small chain-ring. Then FIG. 5B is the result from stage I of shifting, where shifting starts as the chain gets in contact with the larger chain-ring (at point 22) due to the lateral displacement of the chain.

Stage II of shifting occurs between FIGS. 5B and 5C, where the power applied on the cranks is transmitted simultaneously through both chain-rings. This is a critical stage in the shifting process because the support of the chain must be firm enough to transmit the pedalling power. Otherwise the chain would slip and fall towards the smaller chain-ring and the whole shifting process should be re-started. In order to improve the ability to transmit power in this condition, the larger chain-ring can have pins or ramps such as the ones described in U.S. Pat. No. 8,092,329-B2, or as the pin number 22 in the aforementioned figures from EP-0945335-A1. These ramps or pins define hooking points for the chain, so that when it is displaced during rotation, they help fixing the corresponding chain section on the surface of the larger chain-ring oriented towards the smaller chain-ring.

Stage III of shifting occurs approximately between FIGS. 5C and 5D in EP-0945335-A1. In this stage, initially, the contact with the teeth is performed with the external part of the chain until the chain surpasses the height of the teeth and starts to settle on one tooth so that contact is made with the inside part of the chain. The teeth on the larger chain-ring can be lowered to facilitate the chain's lateral surpassing in this stage, such as in the system described in EP-0945335-A1, in which teeth lowering is maximum. Once the chain is in the plane of the larger chain-ring, the settlement of the chain in the tooth valley (and therefore in a position of engagement) depends on the initial tooth contact point.

In shifting systems such as the one described in EP-0945335-A1, where specific shift times are defined, it is possible to synchronize the two chain-rings so that the point of contact with the larger chain-ring is optimal in order to minimize the chain settlement time in stage III.

This synchronization between chain-rings is not only important for stage III. In the disclosure described in EP-0945335-A1, defining a specific "path" for "rising" the chain to the larger chain-ring also allows lowering the teeth of the smaller chain-ring (area M) in order to ease stage I, and accurately position pin 22 in order to optimize stage II, so that a highly optimized chain-ring profile is obtained for upward shifting. This makes possible the fact of avoiding any chain-pushing element and to perform the shifting solely due to the side displacement of the chain that occurs when the smaller sprockets are engaged.

It can be considered that the shifting is already over by the time in which the configuration in FIG. 5D is achieved, where the chain engages appropriately with the sprockets and therefore the power transmission between chain-ring teeth and chain is performed optimally. Still, the chain is not fully settled in the larger chain-ring until reaching the position in FIG. 5F. In this position, when the chain is fully settled in the larger chain-ring (as well as when it is fully settled on the smaller chain-ring) the main limitations of disclosure EP-0945335-A1 show up; due to the large reductions on the teeth profile, it is possible that power transmission is not appropriate at those points and even chain slippage out of the chain-ring can occur due to external vibrations. Therefore, it is preferable to maintain a more complete teeth profile as it is shown in disclosure U.S. Pat. No. 8,092,329-B2, even if this implies more contact and friction during the shifting process, thus becoming essential the use of a derailleur or chain-pushing element that can exert a high force for the shifting to take place, resulting in a more abrupt and less reliable shifting process.

The shifting process from a larger chain-ring to a smaller one can also be broken down into 3 stages (analogous to the shifting from smaller chain-ring to a larger one):

I. Shifting starts with the derailleur pressing on the side of the chain against the teeth of the smaller chain-ring, so that the chain eventually rises above these teeth and laterally surpasses them, thus disengaging from the larger chain-ring and breaking proper power transmission.

II. The cranks rotate while the chain is pushed towards the smaller chain-ring by the derailleur until the tensioned chain gets in to the plane of the smaller chain-ring and makes contact with one tooth on the smaller chain-ring. Throughout this stage, power is transmitted by the last tooth properly engaging the chain on the larger chain-ring.

III. While the derailleur maintains the chain in the plane of the lower chain-ring, the rotation of chain-rings makes the chain to get in contact with different teeth of the smaller chain-ring so that it progressively settles better on the valleys of each tooth (because the step between teeth is larger at the tips than in the valleys due to the largest radius for the same angle), until reaching an appropriate engaging position with one of the teeth in the smaller chain-ring, in which power transmission between chain-ring and chain is efficient, and thus it is considered that the shifting process has ended.

EP-0945335-A1 describes how down-shifting is also performed without any chain-pushing element, just based on the side displacement of the chain that occurs when the larger sprockets are engaged and due to a specific profile of the chain-rings. In FIG. 4B of such document, the shifting process at the end of stage II of a shift towards a smaller chain-ring can be observed. This figure shows that the teeth of the larger chain-ring reduced in region N, which facilitates stage I as much as possible. Also, it shows that the contact with the teeth of the smaller chain-ring is not performed optimally, synchronization is not good, and so it requires a longer stage III for the chain to settle on the smaller chain-ring as compared to a shifting towards a larger chain-ring. This document highlights the difficulty of synchronizing chain-rings for an optimum chain "rise" while also having them synchronized for an optimum chain "descent". In general, in is not possible to synchronize both processes (chain "rise" and "descent"), and usually the chain "rise" process is prioritized.

The teeth reductions in region N shown in EP-0945335-A1 highlight their instability problems against vibrations when transmitting power with the larger chain-ring. In US-2014/0013900-A1 smaller reductions are shown in order to ease the lateral surpassing of the teeth by the chain while keeping a large enough teeth size for stability against vibrations. The disadvantage of these larger teeth is that, once again, they require the use of a derailleur or a chain-pushing element, which implies a more abrupt and less reliable shifting process. Also, it should be noted that in US-2014/0013900-A1 multiple shifting points to shift to a smaller chain-ring are shown without any guarantee of synchronization with the smaller chain-ring, so that stage III of settlement in the shift to a smaller chain-ring is long and not optimal.

Due to the chain's lack of stability during power transmission and not being able to shift chain-rings "at will" (since it is necessary to move the rear derailleur to certain sprockets in order to trigger the shifting), the disclosure described in EP-0945335-A1 did not get any market acceptance. However, shifting systems such as those described in U.S. Pat. No. 8,092,329-B2 and US-2014/0013900-A1 are widely used, and in fact almost exclusively, despite their obvious limitations. In these systems it is necessary to exert big force with the derailleur or pushing-element on the tensioned chain in order to surpass the teeth laterally and allow the chain to settle in a different chain-ring. During this process high friction occurs between the chain and the chain-rings which implies a waste of energy, accelerates wear of transmission elements and may even lead to earlier transmission breakage. During the shifting process, power transmission is also highly affected due to the large time intervals in which the chain is not properly supported by the force transmitting tooth, which not only enhances wear and increases the possibilities of breakage of these elements, but can also cause loss of contact between chain and tooth. Because of this the chain can jump, thus invalidating the shifting or even generating the chain to come off any chain-ring, which ends up preventing power transmission. To limit these jumps and ensure more reliable shifting, disclosures U.S. Pat. No. 8,092,329-B2 and US-2014/0013900-A1 propose certain "paths" for upshifting and for downshifting. However, if the shifting is executed at another point (out of these "paths") or the chain is held with friction until reaching these optimal shift points, or shifting starts in a non-optimal point, there is a high risk of ending up in a failed shifting operation.

This problem with chain-ring shifting is even more significant with non-round chain-rings (e.g. oval-shaped chain-rings), where the distance between the chain-ring teeth and the pushing-element (derailleur) is variable so the efficiency of the actuator decreases. For example, as described in FIG. 3 of U.S. Pat. No. 7,749,117-B2, ovoid chain-rings (and any other non-round chain-ring) can be considered a chain-based power transmission system with variable transmission ratio. The power transmission ratio varies along the pedalling cycle to suit the non-uniform power input (user's pedalling) in order to achieve a more uniform force transmission to the chain. In these systems, by controlling the relative arrangement of the teeth, a proper engagement of the chain with all teeth is achieved, so that the smoothness and effectiveness during power transmission is equivalent to that in round-shaped chain-rings. In this sense the operation with non-round chain-rings can be considered the behaviour benchmark for variable/shifting transmission ratio systems. The limitation of these systems is that the transmission ratio shifting occurs during the pedalling cycle and it is not controllable by the user. Therefore, in order to have different gear ratios in different pedalling cycles, it is necessary to have additional chain-rings (round or not), and perform the shifting to such chain-rings (usually with a derailleur, which is even less efficient with this kind of chain-rings).

In the other hand, sprocket shifting, either upshift or downshift, is done in a very similar way to the chain-ring shifting, but there is an important difference that completely changes the result: sprocket shifting occurs when the chain has no tension, so that the teeth can be easily surpassed laterally with little force and undesired chain jumps are reduced. As in the case of chain-rings, shifting starts from the moment the chain touches the sprocket, but unlike with chain-rings, the chain has no tension at this point and shifting takes place smoothly so that the chain is fully settled by the time it has to transmit power to sprocket tooth in which it is engaged.

In U.S. Pat. No. 8,096,908-B2 some modifications are described for the sprocket teeth in order to smooth out the shifting process: some teeth reductions are indicated for the smaller sprocket to ease the way out of the chain due to the interference between chain and sprocket, as well as additional teeth reductions on the larger sprocket to facilitate the entry of the chain and reduce the settlement phase.

Due to this lower efficiency of the front derailleur regarding the rear derailleur, it is more complicated and less reliable to perform a chain-ring shifting than a sprocket shifting. Therefore, currently shifting strategies that minimize the use of the front derailleur are being used. According to these strategies, the whole range of transmission ratios can be covered with a single chain-ring shift. For example, with two chain-rings of 36 and 52 teeth respectively, and 11 sprockets from 11 to 32 teeth, 22 relationships are obtained, out of which only 13 or 14 are usable in the continuous transition from the lowest transmission ratio to the highest transmission ratio, with contiguous transmission ratio "jumps" between 4% and 15.6% as shown in FIG. 1. The critical point in this shifting strategy is the chain-ring shift, which involves a simultaneous shift of 2 or 3 sprockets in order to maintain a reasonable "jump" between transmission ratios, so it is a complex, slow and prone to failure operation. There are different situations in which this chain-ring shift can be made (9 alternatives in the transmission in FIG. 1), so it is up to the user to choose the right time for it. The idea would be to perform this potentially annoying shifting at a time that affects the rider's activity the least.

In order to limit the problems of sequencing chain-ring shifting with sprocket shifting in the case of less experienced riders, U.S. Pat. No. 5,970,816-A describes a system with a single controller which can control both derailleurs (front and rear) sequentially according to the sequence estimated to be optimal. With electronic shifters such as those in US-2014/0303859-A1 it is also possible to configure the electronic control unit to follow a certain sequence between transmission ratios as a response to simple commands provided with the shifter controller.

U.S. Pat. No. 4,055,093-A also describes a control switch that governs both derailleurs simultaneously, but in this case following a strategy known as "half-step", in which a chain-ring shift occurs at any shift in the transmission relation. For such purpose the proportional size difference between the chain-rings in this disclosure is about half the size difference between successive sprockets, so that with a chain-ring shift a transmission relation that is in between two successive sprockets is obtained, and the number of effective gear ratios is twice the number of sprockets. This shifting strategy presents a better staggering of gear ratios and a simpler and clearer shifting logic, however it requires using the chain-ring shifter at each gear change, which is a great limitation due to the chain-ring shifters available nowadays.

The operation of front derailleurs is a clear limitation of current transmissions, thus the interest of avoiding it in power transmission systems. However, it should be noted that the derailleur has an additional function apart from shifting chain-rings, as it also serves for guiding the chain while running on the selected chain-ring, reducing the risk of chain slippage out of the chain-rings due to vibrations or other external forces. Therefore, if the front derailleur is removed, a chain guide should be added for the chain-ring or means for preventing the chain getting out of the chain-ring's teeth profile should be considered as described in EP-2602176-A1. One of the primary means used in this disclosure to provide more stability to the chain while seating on the chain-ring is to adjust the width of the teeth to the internal width of the links, thereby increasing contact between the two, similar to what is described in U.S. Pat. No. 4,174,642-A. Another way to achieve better stability of the chain on the chain-ring is described in EP-2602176-A1 and consists of a specific teeth profile which considers the support of the chain rollers at different points during the pedalling cycle pedalling: as it is shown in FIG. 16 U.S. Pat. No. 6,325,734-B1, the point of contact between the roller and the chain-ring is changing throughout the cycle. Considering this aspect, U.S. Pat. No. 6,325,734-B1 presents an optimized teeth profile for a force transmission as constant as possible so that a smoother and more silent transmission is achieved. However, the goal of the tooth profile presented in EP-2602176-A1 is to maximize the chain retention. In FIG. 5 of EP-2602176-A1 the interval 74 is delimited in the front flank, wherein the roller engagement on the tooth occurs, and in which optimum power transmission is ensured. Above interval 74 is interval 76 whose aim is to better guide as the rear flank of tooth 70 does. This solution for avoiding the front derailleur has great acceptance in the market, however the number of gear ratios is limited to the number of sprockets.

In order to solve this problem a large number of alternative solutions to perform the chain-ring (or sprocket) shifting have been proposed, for example, EP-0945335-A1, U.S. Pat. Nos. 7,712,566, 5,354,243-A, 5,152,720 A, 4,810,235, 7,156,764 B2, CH-617 992-A5 or US-2014/0248982-A1. Among all, those with the highest relation to the present disclosure proposal are highlighted next, which in turn can be also considered to present a better solution and implementation in the state-of-the-art.

U.S. Pat. No. 5,354,243-A describes a system that does not include a traditional rear derailleur. The sprocket shifting is performed by guiding the chain with the sprockets themselves. It consists of a flexible package of equidistant sprockets with a radial cut. In its default position the sprockets are multiple disk planes defined in space. However, it is possible to deform laterally the sprockets in either direction so that the end of each sprocket is aligned with the end of the next sprocket, forming a spiral on which the chain can move to change the plane, in either sense. Shifting is made completely eliminating stage I of shifting (the output goes directly to the next sprocket without the chain having to overcome the sprocket tooth), the entrance to another sprocket is also straightforward which slightly improves stage II. However, this system requires the chain to be rolling in stage III of settlement, since synchronization between different gears is not optimal. The main limitation of this disclosure is that, due to the flexibility of the sprockets, rigidity and strength problems arise in the power transmission. The disclosure U.S. Pat. No. 5,152,720 A solves this problem by rigid sprockets with an articulated 90-degree section that operates in the same way as the prior disclosure and is valid for changing sprockets as well as for shifting chain-rings, but stage III of shifting is not optimal yet.

CH-617992-A5 discloses a solution similar to U.S. Pat. No. 5,354,243-A with flexible sprockets/chain-rings, but in this case they behave differently. Instead of forming a spiral to move the chain, the new sprocket/chain-ring is formed in the same plane of the previous one so that the chain does not change plane. That is, the plane of the chain transmission is always the same. In CH-617 992-A5 several configurations are also presented in which the chain-rings are divided into several rigid segments that enter the smaller chain-ring's plane while passing through the chain-free zone create a large chain-ring, or that alternatively exit the plane to leave the chain engaged on the smaller chain-ring. A linear displacement parallel to the axial direction of chain-rings, or an angular displacement resulting in the same direction at the end of its route is considered.

All configurations presented in CH-617992-A5 have a similar process to the one provided in U.S. Pat. No. 5,354, 243-A, where stage I has been removed and stage II has been minimized, but also the synchronization between chain-rings is not optimal, and requires a prolonged stage III for settlement, as shown in FIGS. 4B and 5B and in spite of the lowering on teeth 5 and 5a. In these teeth the front flank of the tooth has been lowered so that the chain from the other chain-ring can make contact with the new chain-ring on this flank. But because of the displaced flank, the power transmission from tooth to chain is far from being perpendicular to the chain-ring radius at that point, so it is not performed effectively. In addition, it compromises the support of the chain in the next tooth, unless this is also lowered, which delays the settlement of the chain in the teeth (stage III) and the time when the chain is engaged at an appropriate tooth-point for effective force transmission. And it is possible that, when the chain settles in a position of engagement in a tooth, chain resettlement occurs in previous teeth as illustrated in FIGS. 4C and 5C because the previous supports were not firm enough. This can generate wear and noise due to a large folding between links in chain-ring shifting zone which can cause additional problems when the chain has to leave the chain-rings.

Consider also that teeth 5 and 5a are lowered from the valley along the entire front flank, so that the recess also affects the range of engagement of the chain with the tooth, preventing proper power transmission by those teeth in both the smaller and the larger chain-rings after the shifting process.

These problems in the settlement and power transmission come from a non-optimal angular synchronization between chain-rings because all segments should form a continuous solution when put together. This has the advantage that chain-ring shifting can be initiated with any segment, but restricts the relative position between the teeth involved in both shifting processes (upwards and downwards) limiting the possibilities of synchronization. With these restrictions, in all the preferred solutions all segments have the same shape as illustrated.

Another limitation of the device presented in CH-617, 992-A5 is that the segments have to travel to the same plane of the previous chain-ring, keeping the same working plane, so the allowable size difference between successive chain-rings depends on the tooth height. In this respect the limit is in the 4 teeth difference between chain-rings as illustrated in FIG. 6. However, this embodiment is not recommended because on the one hand the teeth support seems very weak as illustrated in FIG. 7 and on the other hand the height of the teeth is also somewhat low which can present problems in retaining the chain in the presence of vibrations or other external forces, especially considering that the disclosure does not include any measure to improve the stability of the chain on the chain-ring in the absence of a derailleur. In order to implement this disclosure, it would be advisable to have a difference between successive chain-rings of at least 5 or 6 teeth.

In addition to structural problems when the size difference between chain-rings is low, the system presented in CH-617, 992-A5 has additional structural limitations regarding the guiding of the segments and their force transmission capacity, as well as regarding the segment actuators as described in US-2014/0248982-A1. To this end US-2014/0248982-A1 proposes a chain-ring shifting concept similar to CH-617992-A5, but in which a novel solution for guiding and driving is proposed to solve the problems of guiding and driving. However, it provides neither a solution to the limitation of synchronization of segments and chain-rings (extended stage III of shifting) nor a structural solution to use chain-rings with four teeth or less difference with guarantee.

On the other hand, WO2016033623A1 disclosure is based on the US-2014/0248982-A1 but it adds the electronic control of the displacement of the segments, and the disclosure US20020084618 which is an automatic chain-ring shifter based on segments with a shifting mechanism very similar to that described in CH-617 992-A5 and 2014/ 0248982-A1 patents, and therefore with the same limitations.

BRIEF SUMMARY

For overcoming the mentioned drawbacks, the present disclosure proposes a chain-rings set, for a power transmission system, which comprises a chain, a first chain-ring or small chain-ring, a second chain-ring or big chain-ring, having a common axis with the first chain-ring and provided with more teeth than the first chain-ring, wherein the first chain-ring is formed by a support part of the teeth and a teeth part, wherein the second chain-ring is formed by segments, each formed by a support part of the teeth and a teeth part, which comprises axial displacement means of the segments such that they can be moved in an independent manner at least in the direction of the common axis, wherein an up-shift segment of the segments has a first tooth which is the first which is engaged with the chain in the rotation movement, wherein:

the displacement means are configured for moving the up-shift segment to an engaging position such that the first tooth can engage with an engaging link of the up-shift section of the chain, when the chain is engaged in the first chain-ring, and without the support part of the up-shift segment reaching the same plane than the support part of the first chain-ring;

the displacement means are configured for successively moving the remaining segments to an engaging position with the chain without the support parts of the segments reaching the same plane than the support part of the first chain-ring;

and wherein:

a) the first chain-ring and the second chain-ring have an even number of teeth and wherein the engagement chain-link of the up-shift section is a wide link; and/or b) the first tooth of the up-shift segment has its tip displaced with respect to the medium plane of the support part of the up-shift segment towards the side corresponding to the first chain-ring; and/or c) the first tooth of the up-shift segment is recessed in its side opposite to the first chain-ring, such that a surface for guiding the chain to the engaged configuration is defined.

It is understood by teeth part the part of the chain-ring comprised between the external envelop line and the base line, defined below, and the support part is the part of the chain-ring comprised in the part interior to the teeth part, that is the part externally bounded by the base line.

The proposed disclosure defines, respect to the known prior art, a segmentation of the second chain-ring wherein each one of the segments can have a specific function, with first segments (up-shift) ensuring a proper engagement in the start of the shift. This implies respect to the known prior art that a particular sequence in the displacement of the segments in the shifting process has to be carried out. Moreover, the best initial engagement of the chain can overcome one of the limitations/conditions of the prior systems by enabling the chain ring shifts even when the segment has not been completely moved to the plane of the small chain-ring. In particular, with respect to the CH 617 992 solution, the present disclosure offers higher structural strength, since the support parts of the segments of the second chain-ring can be as large as necessary without being limited by the diameter of the envelope of the first or small chain-ring.

The set may include the following optional features that can be combined whenever technically possible.

In some embodiments, the support parts of the segments of the second chain-ring are supported by the support part of the first chain-ring.

Therefore, a significant advantage is the possibility of supporting the segments of the second chain-ring or large chain-ring in the support part of the first or small chain-ring, contrary to what is disclosed in CH 617 992, where the segments are supported on a common part. As will be seen below, some very advantageous features of the present disclosure relate to the very precise relative positioning between chain-rings, which is accomplished by attaching them directly to each other without intermediate common part. This also presents advantages regarding the driving of the segments and in the forces transmission and therefore in the stiffness/strength/weight ratio.

Regarding the feature that the engaged chain-link of the up-shift section which is engaged with the first tooth of the segment or of the segments for chain shifting from the first chain-ring to the second chain-ring (up-shift segments) is a wide link, we point out the following:

As it is known, most of the chains successively connect wide links and narrow links, which ends lie between chain-rings, more external, of the wide links. If it is ensured that the first link that will contact the first segment (up-shift) that initiates the shift to a big chain-ring is a wide link, due to an increased internal engaging space of this link with the teeth, a larger distance of the segment displaced out of the normal operating plane of the small chain-ring can be tolerated while ensuring a proper engagement, by normal operation being understood the operation when no shifting process is being carried out. To ensure that this condition is fulfilled without interruption, it is necessary to keep the synchronism between the chain-ring and the chain, thus making necessary that both chain-rings have an even number of teeth.

It is convenient to point out that the first link of the chain is not a specific or unique link of the chain, but it can be any link that will engage with the first tooth of the first segment (up-shift) that will change between revolutions of the chain-rings and in any revolution it will possible to carry out the process for chain-ring shifting. It is also understood that the links indicated in the rest of the document can make reference to any other link of the chain in the same situation.

In some embodiments, the chain-rings are angularly displaced such that, in a starting configuration for shifting from the first chain-ring to the second chain-ring and in conditions of up-shift tensed section, which is the tensed section of the chain between both chain-rings:

a last tooth of the first chain-ring is engaged in the up-shift section, with an engaged chain-link of this up-shift section, such that a front flank, which is the flank that pushes the links of the chain, of the last tooth of the first chain-ring contacts an engaged roller of the engaged chain-link of the up-shift section; and a first tooth of the up-shift segment, is engaged in the up-shift section, with an engaged chain-link of this up-shift section, such that a front flank of the first tooth of the up-shift segment contacts an engaged roller of the engaged chain-link of the up-shift section.

The engagement of a link of the chain with a tooth of a chain-ring is defined when a roller of the link (the first roller of the two which contacts the chain-ring teeth, the other roller being called roller of the following link) contacts a front flank of the tooth, when this front flank is approximately tangential to the chain, such that the pressure of the roller on the tooth is carried out approximately in a normal direction, this being the most efficient way of transmitting the force between the chain-ring and the chain. In the configurations no for shifting from the transmission either in the big or the small chain-ring the last tooth of the chain-ring is engaged with the chain in a determined point, whereas the engagement in the previous tooth which previously was carried out at the same height is carried out in a point closer to a valley of the front flank, since the pitch of the chain is usually bigger than the pitch of the chain-ring (especially when these elements have some wear). Due to this behaviour, the engagement of the chain with the tooth is produced in an engagement interval, which is a part of the front flank. When the contact exits the front flank, the optimum power transmission conditions are not longer met, and therefore the chain is no more engaged in that tooth and is simply seated. In this way, the chain is only engaged in a few teeth during the forces transmission, in spite of being seated in most of the teeth.

In the configuration for chain-ring shifting from small to big one, the small chain-ring is transmitting force through a last tooth to a roller of the chain which leans on the front flank in a position close to the valley thereof tooth. Thanks to the transmitted force the chain remains tensed. In this condition it is preferable that the contact of the roller of the chain in the big chain-ring occurs in the front flank of the first tooth of the up-shift segment, such that the big chain-ring can transmit efficiently the force to the chain from the initial contact moment to ensure a smooth, precise and reliable shifting.

Emphasizing the importance that the first contact of the chain with the new chain-ring is made in an unmodified front flank respect to the optimized front flank design for power transmission in non-shifting positions in which the same properties for transmission of forces are maintained in the range of engagement, because on the one hand it ensures the optimal capacity for power transmission, and secondly the later stage of seating of the chain in the valley between teeth is accelerated, therefore the shift phase III is shorter, thus faster shifts are achieved. While the transmission of forces is effective at any contact position with the front flank, the preferred one is when the roll is supported as close as possible in the valley because it is the position that provides more stability in front of vibrations or other external forces that might disengage the chain.

In some embodiments, the second chain-ring has four more teeth than the first chain-ring.

For a chain roller of about 8 mm and a pitch of 12.7 mm at least a four teeth difference between successive chain-rings is necessary for their profiles not to interfere. That is, to engage the chain in the second chain-ring or a bigger chain-ring when this chain-ring is close to the first chain-ring, it is necessary that its edge closest to the centre of rotation not to be in contact with the teeth of the small chain-ring. In the present disclosure, since both chain-rings are at different planes this interference is not problematic as long as the separation is enough to save the width of the chain when it is engaged in the big chain-ring, width taken in the axial direction, at least in the interference zone. Under these conditions, the teeth of each chain-ring will have sufficient support in his operating plane to transmit the impelling force. In the specific case of a four teeth difference, the chain does not interfere with the small chain-ring, specifically with the crest of his teeth, such that it is possible to bring the segments of the small chain-ring to the extent permitted by the support parts of both chain-rings, these support parts making the difference with respect to the known prior art and being capable of transmitting power with guarantees. The four teeth difference between chain-rings is a particularly optimal configuration to implement "half-step" shift strategies. For example, with two chain-rings having 48 and 52 teeth, and nine sprockets having 11 to 43 teeth, 18 relations are obtained, all useful that cover the same range as a common transmission but with steps more uniform between 7.7 and 10.8% having a better amplitude of transmission ratios and a simpler and clearer shift logic, compared with currently used shift strategies. The "half step" strategy can also be advantageously employed in the context of combinations such as 50-54, 46-50, 44-48, etc.

Regarding the feature that the first tooth of the up-shift segment has its tip displaced with respect to the middle plane of the support part of the up-shift segment towards the side corresponding to the first chain-ring we point out the following:

At the time of shifting, the chain will tend to approach the next engagement tooth in the same plane in which it operates, which happens to be the same plane of the small chain-ring or a plane slightly tilted to one side or the other depending on the rear sprocket engaged. If the chain is engaged with the largest sprocket, the chain will approach the engagement tooth in a position even more away from the big chain-ring (considering that the large chain-ring is in an outer position and the small chain-ring in the inner position, more near the frame, as usual, and the large sprocket is in the innermost position and the small sprocket on the outside, as usual. This arrangement is to be used in the description of the disclosure, but it is obvious that the disclosure can also work with other provisions), whereas if the chain is engaged on the small sprocket, it will be closer to this next tooth in a closer position. In either of these cases, if the tip of the first tooth of the up-shift segment moves towards the first chain-ring, is provided that the chain engages with this tooth. On the other hand, this displacement of the tooth, which can be obtained for example with an asymmetric widening towards the chain-ring, should not interfere with the subsequent engagement of the chain when is engaged in the big chain-ring. Here, the widening margin is larger if the tooth will always engage a wide link.

Regarding the feature that the first tooth of the up-shift segment is recessed in its side opposite to the first chain-ring, such that a surface for guiding the chain to the engaged configuration is defined we point out the following:

As described, the contact of the chain with the first tooth of the first segment (up-shift segment) will occur from the side of the first chain-ring, thereby limiting the thickness of the opposite side will create a more centered tip respect to the chain. If this cut is sloped a smoothly and gradually guiding is achieved and the chain will move laterally towards the plane of the big chain-ring as the chain progressively engages with the tooth.

In some embodiments, one or more teeth immediately subsequent (according to the engagement sequence) in the engagement to the first tooth of the up-shift segment are cut down in its side opposite to the first chain-ring, such that surfaces for progressively guiding the chain to the engaged configuration are defined.

It is possible that the chain already starts the engagement with subsequent teeth before being fully engaged in the first tooth of the up-shift segment, so it is useful for the reasons previously stated that the successive teeth to this first tooth are displaced and lowered to fit to the inner space of the wide or narrow link with which it will engage, facilitate the engagement of the link in question by moving the tip of the resulting tooth towards the link, and is sloped so as to, when engaging the tooth, the form thereof contribute to move the chain to the operating plane in the big chain-ring.

In some embodiments, the last tooth of the first chain-ring which is completely engaged with the engaged chain-link of the up-shift section and/or any tooth subsequent which is partially engaged with a link of the tensed chain section of the chain in the configuration for shifting from the first chain-ring to the second chain-ring is displaced with respect to the medium plane of the support part of the first chain-ring and in the side corresponding to the second chain-ring.

To facilitate the process for shifting from the first chain-ring to the second chain-ring it is preferable that the chain is in the position closest possible to the second chain-ring at the beginning of the shift. To that end, the first tooth and subsequent are biased towards the second chain-ring, thus forcing the chain to be closer to the second chain-ring at the time of shifting, which facilitates it. This aid is most noticeable when the large sprocket is engaged and the chain is farther from the large chain-ring. This widening of the teeth should not interfere with the engagement of the chain when coupled with the small chain-ring. Here, the widening margin is larger if the tooth will always engage a wide link. This is true, for example, for the tooth subsequent to the first tooth, when the first tooth of the first segment is wide and there is an odd number of transition links with the tooth of the first chain-ring, which is a narrow tooth, for example, three transition teeth in chain-rings having 48 and 52 teeth.

In some embodiments, the last tooth of the first chain-ring and/or any tooth subsequent are cut down in its side opposite to the second chain-ring.

In the moment when the chain engages a tooth of the first segment (up-shift segment), the latter will move it towards the plane of the second chain-ring. If these teeth of the first chain-ring are cut down in the side opposite to the second chain-ring they offer less resistance to this lateral displacement of the chain in the shifting moment.

In some embodiments, a down-shift segment or second segment has a last tooth which is the last tooth engaging with the chain in the rotation movement in the second chain-ring, and the displacement means are configured for simultaneously:

take a complementary segment, which is a third segment, out of the engaging position and bring the up-shift segment to a configuration wherein the last tooth of the down-shift segment is engaged with an engaged chain-link of the chain of the down-shift section, an engaged chain-link of the down-shift section is engaged in the first tooth of the first chain-ring, and without the support part of the down-shift segment reaching the same plane than the support part of the first chain-ring.

In the set according to the disclosure they are up-shift segments and down-shift segments. Other segments are also defined, so called complementary segments, that do not have a specific function for up-shifting or down-shifting, but they have the function to further segmenting the chain-ring, especially such that the segments are smaller.

The segmentation proposed therein, understood as the establishment of the start of the down-shift segment, reaches to arrange, simultaneously in the same chain-rings set, specific segments for down-shift of the chain and for the up-shift of the chain between adjacent chain-rings unlike the known prior art. This allows, unlike the known prior art, to operate with segments that form a second chain-ring with an operating plane different from the first chain-ring with a proper transition of the chain in any chain-rings shift.

In some embodiments, the first link subsequent in the engagement to the engaged chain-link of the down-shift section wherein the seating area is bigger than the 50% of the complete seating area when the engaging roller of the down-shift section contacts the front flank of the first tooth of the first chain-ring in a configuration for shifting from the second chain-ring to the first chain-ring, the so-called centering link, is a wide link.

In the case the synchronism of the engagement of the wide/narrow links with the teeth is maintained, it is preferable that the first link which contacts a tooth of the first chain-ring to be a wide link that offers a major tolerance for the centering and guiding of the chain in the shift from between chain-rings, which is specially useful when the chain is engaged with a rear sprocket small or big and the operating plane of the chain forms a small angle with respect to the plane of the chain-ring wherein it lies.

This centering link will fulfill its guiding and centering function during the seating process on the centering tooth corresponding. Therefore, for obtaining a good guiding and centering, it is necessary that the seating of this link is sufficient. The seating area can be established as the overlapping area between tooth and link in a lateral projection when the engaging roller of the down-shift section contacts the front flank of the first tooth of the first chain-ring in a configuration for shifting from the second chain-ring to the first chain-ring. The complete seating area is defined as the seating area of a tooth wherein the chain is completely seated. And the seating degree of a tooth is established by comparing its seating area with respect to this complete seating area.

In some embodiments, the chain-rings are angularly displaced such that, in a starting configuration for shifting from the second chain-ring to the first chain-ring and in conditions of tensed chain in the chain down-shift section:

the last tooth of the down-shift segment is engaged in the down-shift section, with the engaged chain-link of this down-shift section, such that its front flank contacts the engaged roller of the engaged chain-link of the down-shift section; and the first tooth of the first chain-ring is engaged in the down-shift section, with the engagement chain-link of this down-shift section, such that its front flank contacts the engagement roller of the engagement chain-link of the down-shift section.

In the shifting configuration from the big chain-ring to the small one, the big chain-ring is transmitting force through a last tooth to a roller of the chain, which leans on the front flank in a position close to the valley thereof. The chain is tensed thanks to the transmitted force. In this condition it is preferable that the contact of the roller of the chain in the small chain-ring occurs in the front flank of the first tooth of the small chain-ring, such that the small chain-ring can transmit efficiently the force to the chain from the initial contact moment to ensure a smooth, precise and reliable shifting. The proposed disclosure presents a specific segmentation of the big chain-ring to simultaneously meet for the first time both this preference of synchronism for shifting, and the preference of synchronism of shifting from the first chain-ring to the second chain-ring.

In some embodiments, the centering tooth has the tip displaced with respect to the medium plane of the support part of the first chain-ring in the side corresponding to the second chain-ring.

In the shifting moment the chain will tend to move towards the following engagement tooth in the same plane where it lies, which is the same plane of the big chain-ring or a plane slightly sloped towards one or other side depending of the engaged rear sprocket. If the chain is engaged with the smallest rear sprocket, it will get closer to the engaging tooth in a position even farther with respect to the bigger chain-ring, whereas if the chain is engaged in the big rear sprocket it will get closer to the small chain-ring in a closer position. In any of the cases, if it moves towards the second chain-ring the tip of the tooth previous to the tooth of the first chain-ring which will be the first which contacts the chain, even if subsequently it does not engage completely, it makes easier that the chain starts the engagement with this tooth. On the other hand, this widening of the tooth must no interfere in the engagement subsequent of the chain when it is engaged in the small chain-ring. In this regard, the widening margin is bigger if the tooth will always engage a wide link.

In some embodiments, the centering tooth is recessed in its side opposite to the second chain-ring, such that a surface for guiding the chain to the engaged configuration is defined.

The contact of the chain with the centering tooth of the first chain-ring will occur from the side of the second chain-ring, such that by limiting the thickness of the opposite side will create a tip more centered with respect to where the chain will engage. If this cut is sloped it is possible to smoothly and progressively guide and also laterally displace the chain towards the small chain-ring as it goes on engaging with the tooth.

In some embodiments, one or more teeth immediately subsequent to the centering tooth are cut down in its side opposite to the second chain-ring, such that surfaces for progressively guiding the chain to the engaged configuration are defined.

It is possible that the chain already starts the seating with subsequent teeth before the centering tooth reaches its final seating condition. That is why, it is useful for the reasons previously mentioned that the teeth successive to this second tooth to be displaced and cut to adapt to the internal space of the wide or narrow link with those with which it should engage, the seating of the link involved is facilitated by moving the tip of the resulting tooth towards the chain-ring and there is a slope such that when the tooth is seating its shape contributes to guide/displace the chain to the operating plane in the small chain-ring.

In some embodiments, the first teeth of the complementary segment are cut down in the side of the first chain-ring to avoid the engagement of the chain in this complementary segment in a configuration for shifting from the second chain-ring to the first chain-ring and a surface for guiding the chain towards the engaging plane in the first chain-ring is defined.

The segments of the second chain-ring are away enough from the first chain-ring for preventing the chain to engage with them when it is on the first chain-ring or small chain-ring. However, in a process for shifting from the second chain-ring to the first chain-ring the chain is engaged in the down-shift segment of the second chain-ring, which is in its position more close to the first chain-ring. Even then, the chain is closer to the complementary segment or third segment of the second chain-ring which is in its farthest position from the first chain-ring, such that a possibility exists that the chain engages in this complementary segment of the second chain-ring, instead of going down to the first chain-ring. For preventing this, it is convenient to cut the side towards the first chain-ring of the first teeth of the complementary segment to prevent the chain from engaging with this segment, and to create a sloped surface for guiding the external face of the links towards the first chain-ring in a chain operating plane.

In some embodiments, the last tooth of the down-shift segment and/or the previous ones have their upper or superior tip displaced with respect to the medium plane of the support part of the down-shift segment in the side corresponding to the first chain-ring.

To facilitate the process for shifting from the second chain-ring to the first chain-ring it is preferable that the chain is in the position as close as possible to the first chain-ring. To this end, the last tooth and the previous are displaced (or widened) towards the first chain-ring, such that it forces the chain to operate closer to the first chain-ring in the shifting moment, facilitating it. This is even more noticeable when the small rear sprocket and the chain are engaged farther from the small chain-ring. This widening of the teeth must no interfere in the engagement of the chain when is coupled to the big chain-ring. In this regard, the widening margin is bigger if the tooth always engages with a wide link. This is fulfilled, for example for the last tooth of the second segment when the chain-rings have 48 and 52 teeth.

In some embodiments, the last tooth of the down-shift segment and/or the previous ones are cut down in their side opposite to the first chain-ring, such that a surface for guiding the chain towards the engaging plane in the first chain-ring is defined.

In this way, it is allowed that the chain moves closer toward its correct position in the other plane, that is it can twist when it is still in the last tooth contacting the segment of the big chain-ring.

In some embodiments, the down-shift segmentation cut prolongs the rear flank such that it does not interfere with the roller subsequent in the engagement to the engaged roller of the down-shift section in the position for shifting from the second chain-ring to the first chain-ring.

This segmentation cut prevents form creating a supporting point non-optimal of the chain in the down-shift segment subsequent to the last tooth of this segment such that the force transmission is carried always out in optimum conditions.

In some embodiments, the front flanks of the teeth prior to the first tooth of the first chain-ring are cut down above the engagement interval, interval wherein the force transmission between the chain-ring and the chain in the non-shifting position is produced, so as not to interfere with the rollers of the chain down-shift section subsequent to the engaged roller of the down-shift section and prior to the engagement roller of the down-shift section in the position for shifting from the second chain-ring to the first chain-ring.

These cuts prevent form creating a supporting point non-optimal of the chain between the last tooth of the down-shift segment and the first tooth of the first chain-ring so that the force transmission is carried always out in optimum conditions. Since this cut is carried out above the engagement interval, it does not affect the power transmission of the small chain-ring during the non-shifting configuration, and can only slightly affect for retention effects of the chain in this point.

In some embodiments, any tooth having a partial engagement lesser than 50%, called interfering tooth, has its height reduced with an oblique cut, aimed at avoiding interference with the chain in the shifting processes from the first chain-ring to the second chain-ring and from the second chain-ring to the first chain-ring.

The teeth with a low degree of engagement are teeth of the first chain-ring closest to the first tooth of the first segment in an up-shift process or to the last tooth of the second segment in a down-shift process. In both cases, due to the low engagement and excessive proximity to the teeth of the second chain-ring, they are not proper teeth for collaborate in the shifting process, and then it may be desirable to cut them down such that they do not intervene.

In some collaborating the interfering tooth and adjacents have an over-thickness towards at least one side. Side is understood as the lateral sides of the tooth, that is that the tooth has an over-thickness in the axial direction.

If the interfering tooth has a cut-down, so as not to interfere in the shifting process, it can affect to the stability of the chain in that point when circulate over the small chain-ring. For compensate it, it is convenient that this tooth, the previous one and the subsequent have the maximum possible width on both sides for better subjecting the chain in this critical zone and prevent the chain from disengage due to vibrations or other external forces. In this regard, the widening margin is higher if the tooth always engages with a wide link. If one of these teeth is a tooth intervening in the shift, this tooth cannot be widened if so the shifting process is affected.

In some embodiments, teeth not intervening in the shifting process, coinciding with wide links of the chain, have an over-thickness towards at least one side.

The teeth involved in the shift processes (to big or small chain-ring) have additional thicknesses and cuts for optimizing these processes, but in any case pose no problems when the chain engages one of these chain-rings. For improving the guiding problem of the systems for chain-ring shifting without derailleur, it is proposed to also increases the width of the teeth that do not intervene in the shift processes to the extent allowed by the interior space of the chain to improve the guiding and retention of the same. This widening can be carried out in the two chain-rings, towards one side or both. For example, in the small chain-ring it can be interesting not to widen additionally towards the side of the big chain-ring, since this would imply to carry out cuts in the segments of the big chain-ring to avoid collisions and this could excessively weaken these segments in the moment of transmitting the power.

In some embodiments, the second chain-ring has cavities for housing the teeth of the first chain-ring having over-thickness towards the side of the second chain-ring.

If any tooth of the first chain-ring widens beyond the support plane towards the side of the second chain-ring, for improving the shift process (guiding or centering teeth), or for guiding in normal (non-shifting) operation in the first chain-ring, these teeth will contact the adjacent segment when its support plane approaches the first chain-ring, so it will be necessary to create a housing or minimum recess to avoid this contact, but without significantly weakening the support part of the segment and ensuring its ability to transmit the advancing forces.

In some embodiments, the last tooth of the down-shift segment and/or one of the teeth prior to the first tooth of the up-shift segment have a recess in the rear flank so as not to interfere with the rollers of the chain in the moment of unseating of the chain of the chain-ring in any shift position.

The higher engagement point of the chain in the front flank of a new chain-ring respect to the contact in the engagement interval that would have to go on engaging in the same chain-ring, implies that this roller will experiment a larger displacement towards the valley between tooth during the pedalling cycle, such that the previous rollers are also more displaced towards the rear flank of the previous tooth, thus being possible in some cases define a contact that makes difficult the unseating of the chain at the end of the cycle. For avoiding this effect, it is possible to slightly recess the rear flank of these teeth thus only slightly affecting to the chain retention properties of these teeth.

In some embodiments, the first and second chain-rings are circular, oval or variable radius chain-rings.

The proposed disclosure is valid for chain-rings with any shape, and in all of them the shifting process is just as fast, smooth, efficient and reliable. On the contrary, the systems based on derailleurs exhibit major drawbacks in the shift with non-circular chain-rings like for example the oval chain-rings widely used in the market. In such a way, the operating advantages of the proposed system are even better in these chain-rings having non constant radius, in spite of this not being mentioned in the prior part corresponding to laterally displacing segmented chain-rings. This may be because in chain-rings having variable radius it is not possible that all the segments have the same shape as it is the case with the segments of the segmented chain-rings systems already disclosed. In these chain-rings having variable radius it is necessary segment the chain-rings in a particular way as disclosed in this disclosure.

In some embodiments, the up-shift segment and the down-shift segment are the same shifting segment.

The important part of an up-shift segment is an initial cut that favours an optimum shift to a big chain-ring, whereas the important part of a down-shift segment is its final cut that favours an optimum shift to a small chain-ring. These two cuts could form a single segment (that would the junction of an up-shift segment with a down-shift segment with possible segments placed in between). According to the dimensions of both chain-rings and operating conditions, this could be a small segment easy to move, or a big segment that exhibits more problems in its displacement. In the latter case, many solutions could be used like using a pulley to increase the chain free zone, carry out the displacement when the final part of the segment is still engaged with the chain in such that it moves laterally the chain in its disengagement of the chain-ring in the shifting movement, or the case wherein the segment would had some flexibility such that the starting part subjected to a shift to a bigger chain-ring would be completely moved, whereas the final part subjected by the chain in its disengagement does not move or it does to a lesser extent.

In some embodiments, an envelop external line of the first chain-ring is located at a minimum distance from a baseline of the second chain-ring, this minimum distance being the difference between the roller radius and the radius of the outer circular contour of the link. The line base is the line passing through the lowest point of the valleys of the chain-rings. Therefore, for the chain-rings we make reference, from lowest to highest distance of the axis, the base line, to the primitive line and the envelop, which is the most external and which passes through the tips of the teeth (those not having the tip cut-down).

This is the condition for that the chain engaged on the big chain-ring does not collide with the tips of the teeth of the small chain-ring in its operating position which means that the support parts of both chain-rings are close together. The minimum indicated distance refers to the case with a four teeth difference that would be an optimal configuration for implementing the "half-step" shifting strategy.

The concepts disclosed can also be applied to other equivalent configurations and different sizes and can be applied to other fields wherein a smooth, accurate, and with multiple relations power transmission is needed.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures.

DETAILED DESCRIPTION

As shown in the figures, the disclosure relates to a chain-rings set 1, 2 for a bicycle power transmission system, which comprises a chain 3, a first chain-ring 1, a second chain-ring 2 having a common axis E with the first chain-ring 1 and provided with more teeth than the first chain-ring 1, that is to say, that the second chain-ring 2 is bigger than the first chain-ring 1.

Figure 7:
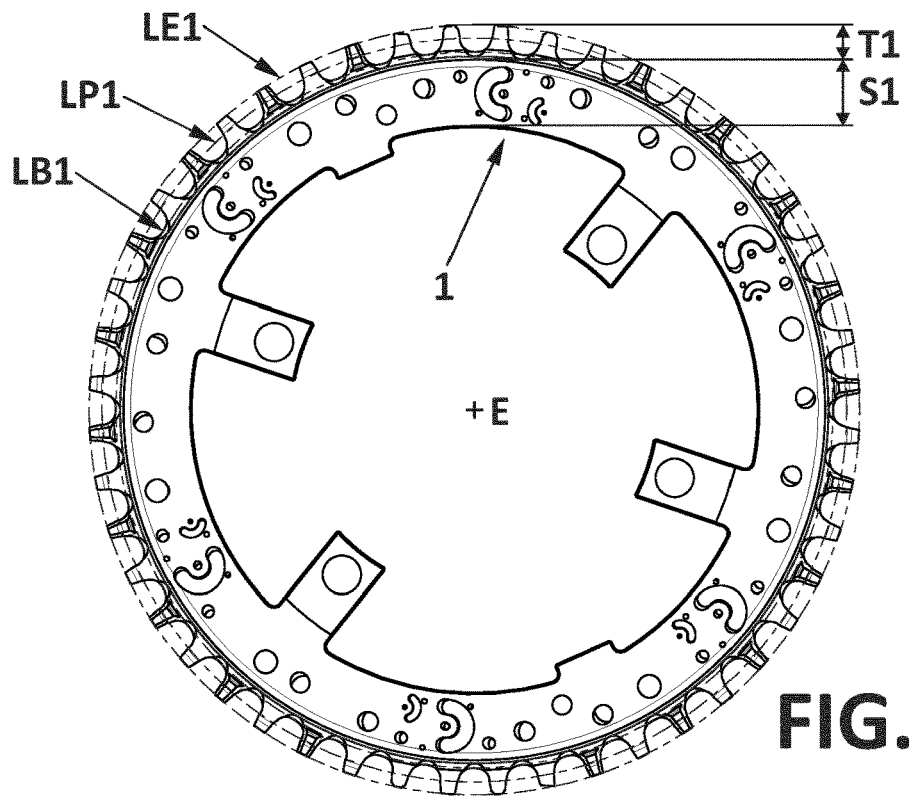
FIG. 7 shows the small chain-ring isolated. It is a non-segmented chain-ring.
Figure 8:
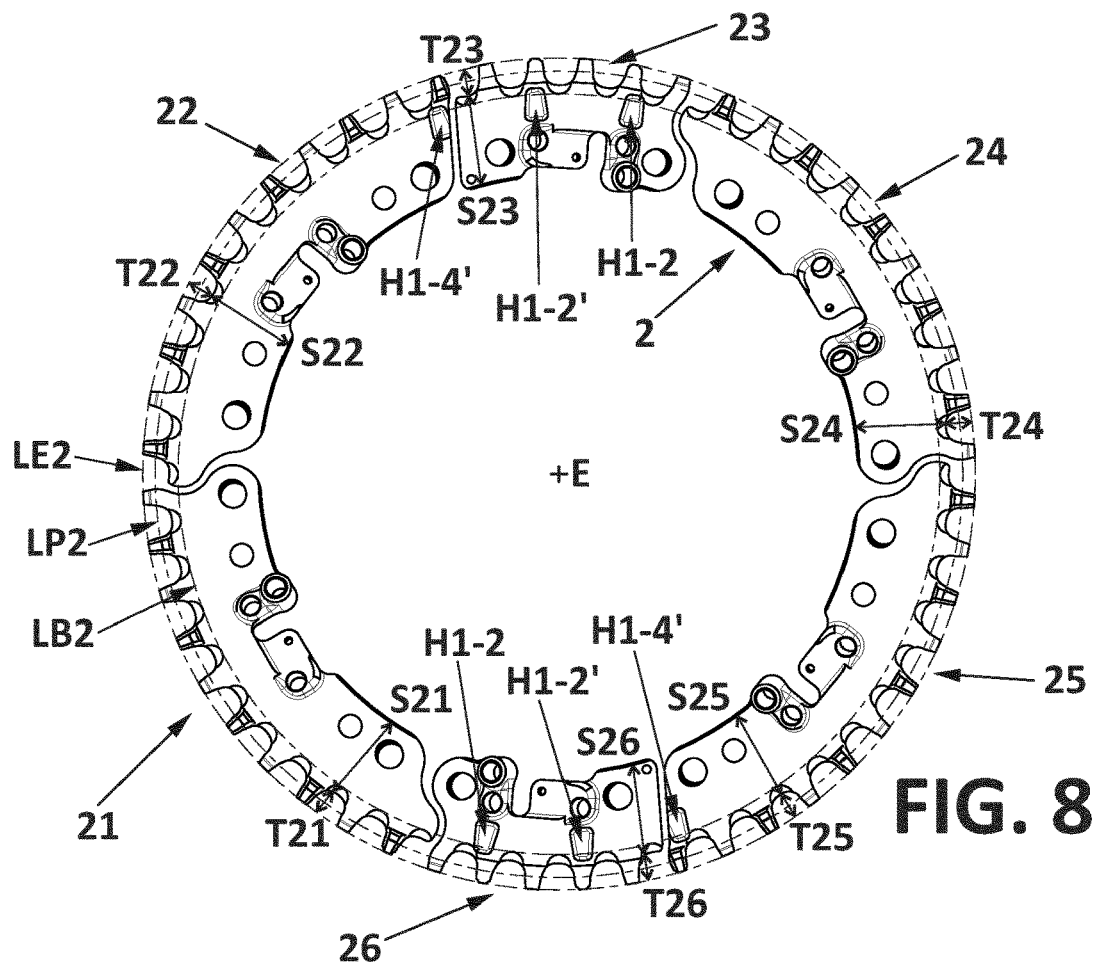
FIG. 8 shows the components of the big chain-ring, that is, the segments.
Figure 9:
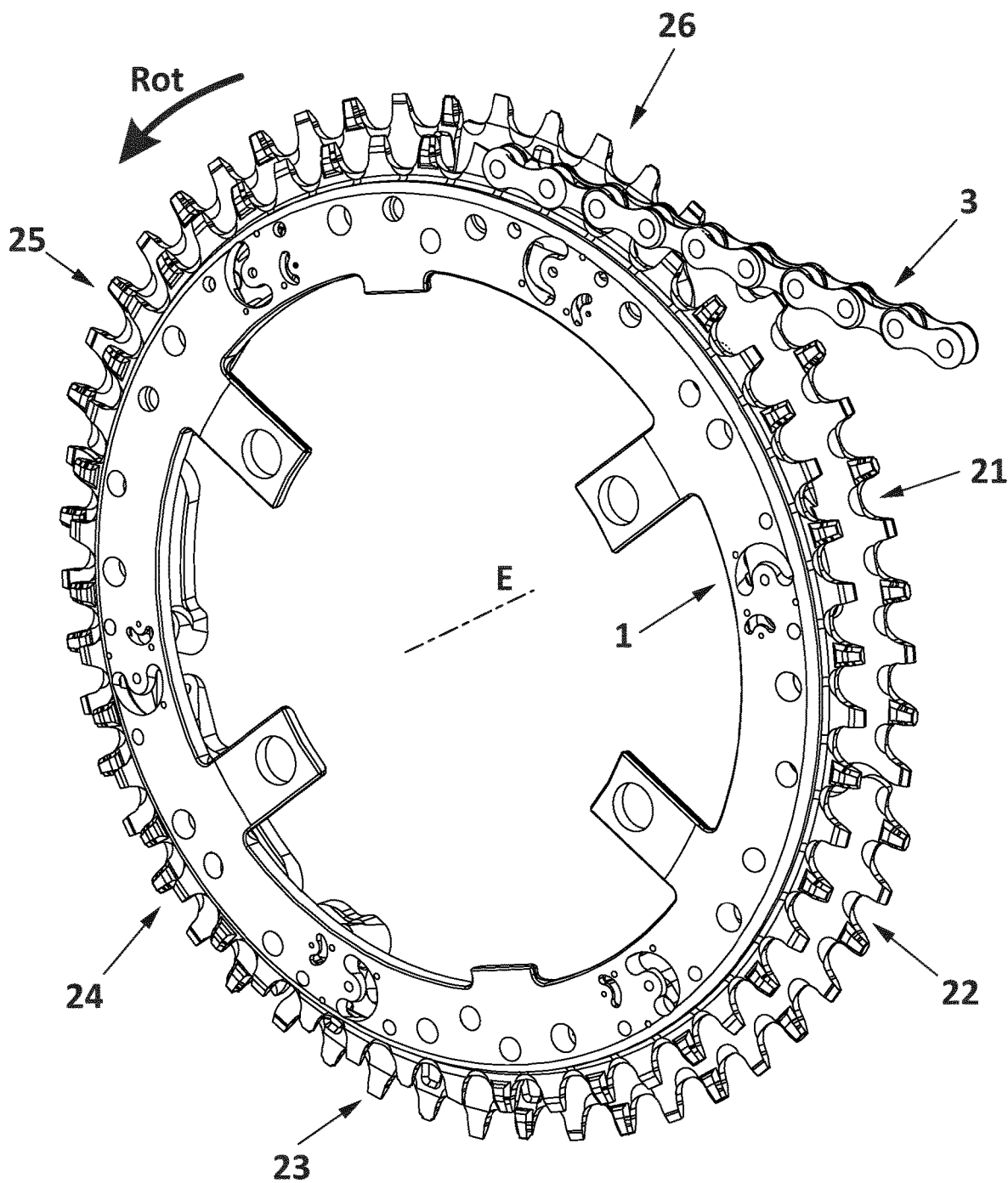
FIG. 9 shows the set composed of a small chain-ring, a big chain-ring and a chain in the configuration wherein the power is transmitted through the small chain-ring.

As shown in FIGS. 7 and 8, in each one of the chain-rings a primitive line LP1, LP2 is defined, which is the line, or circle in the case of circular chain-rings, passing through the centres of the rollers of the links when they are correctly seated in the valleys. An external envelop line LE1, LE2 is also defined, which is the line passing through the tips of the highest teeth and a base line, LB1, LB2, which is the line passing through the lowest points of the valleys between teeth. These lines are also circular in the case of circular chain-rings, or follow the polar function corresponding that defined in chain-rings having variable radius, like the oval ones.

The base line LB1, LB2, is the one that separates the teeth part from the support part. Thus, the support part is the one inside the base line LB1, LB2, and the teeth part is the one between the envelope line LE1, LE2 and the base line LB1, LB2.

Then, as shown in FIG. 7, the first chain-ring 1 is formed by a support part S1 of the teeth and a teeth part T1 and, as shown in FIG. 8, the second chain-ring 2 is formed by segments 21, 22, 23, 24, 25, 26 each formed by a support part S21, S22, S23, S24, S25, S26 of the teeth and a teeth part T21, T22, T23, T24, T25, T26. The segments 21, 22, 23, 24, 25, 26 are defined by an initial cut and a final cut, the first tooth being located just after the valley wherein the segmentation or cut is carried out.

The set comprises means of axial displacement for the segments 21, 22, 23, 24, 25, 26 such that they can be moved in an independent manner at least in the direction of the common axis E.

Thus, the segments are 'pieces' of chain-ring that can be moved and change the operating plane with the purpose of shifting the chain-ring, without the need of the derailleur of the chain 3.

Figure 3:
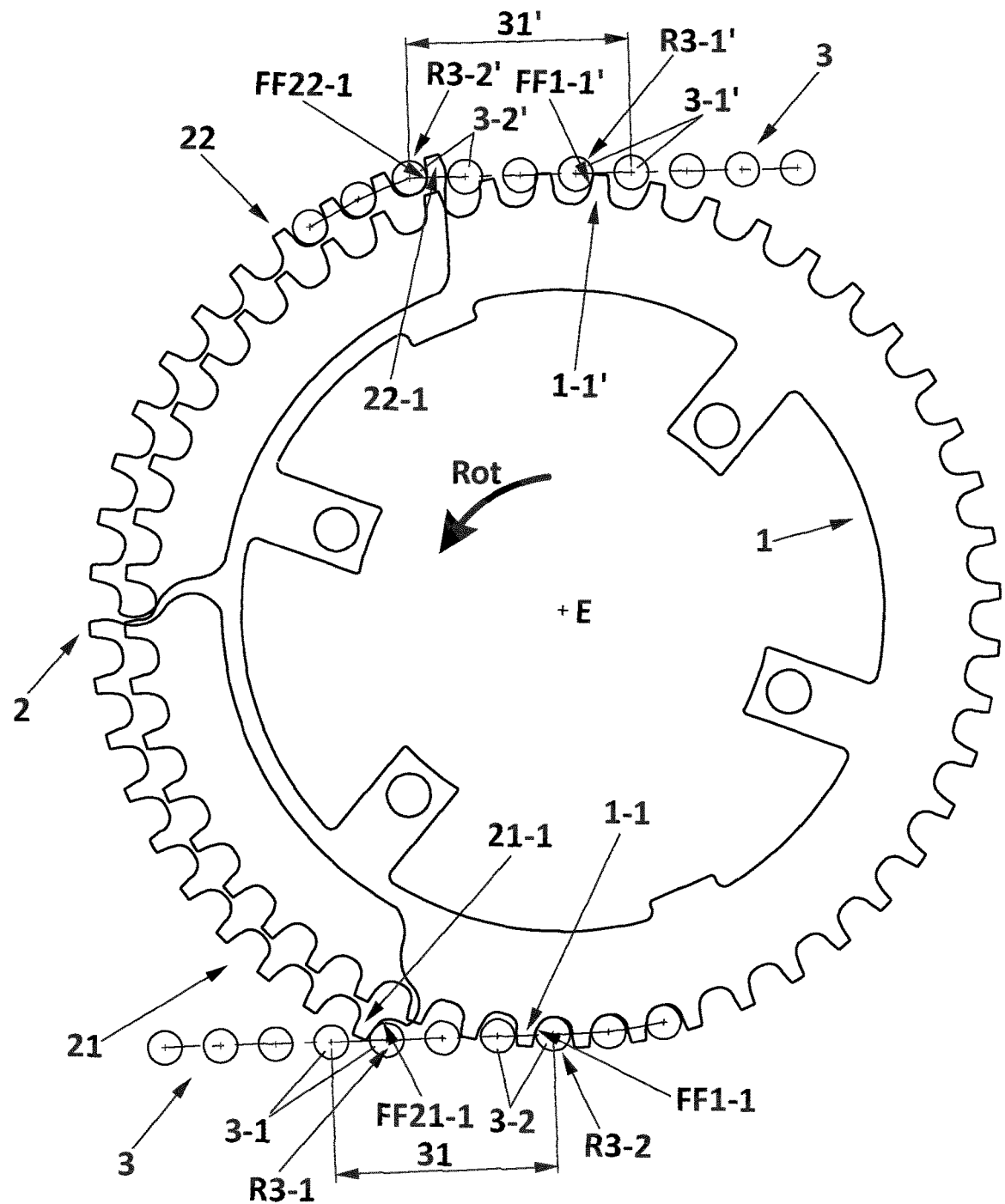
FIG. 3 shows the engagement of the chain between the small chain-ring and the up-shift segment of the big chain-ring, and simultaneously shows the engagement of the chain between the down-shift segment of the big chain-ring and the small chain-ring in a different moment.
Figure 10:
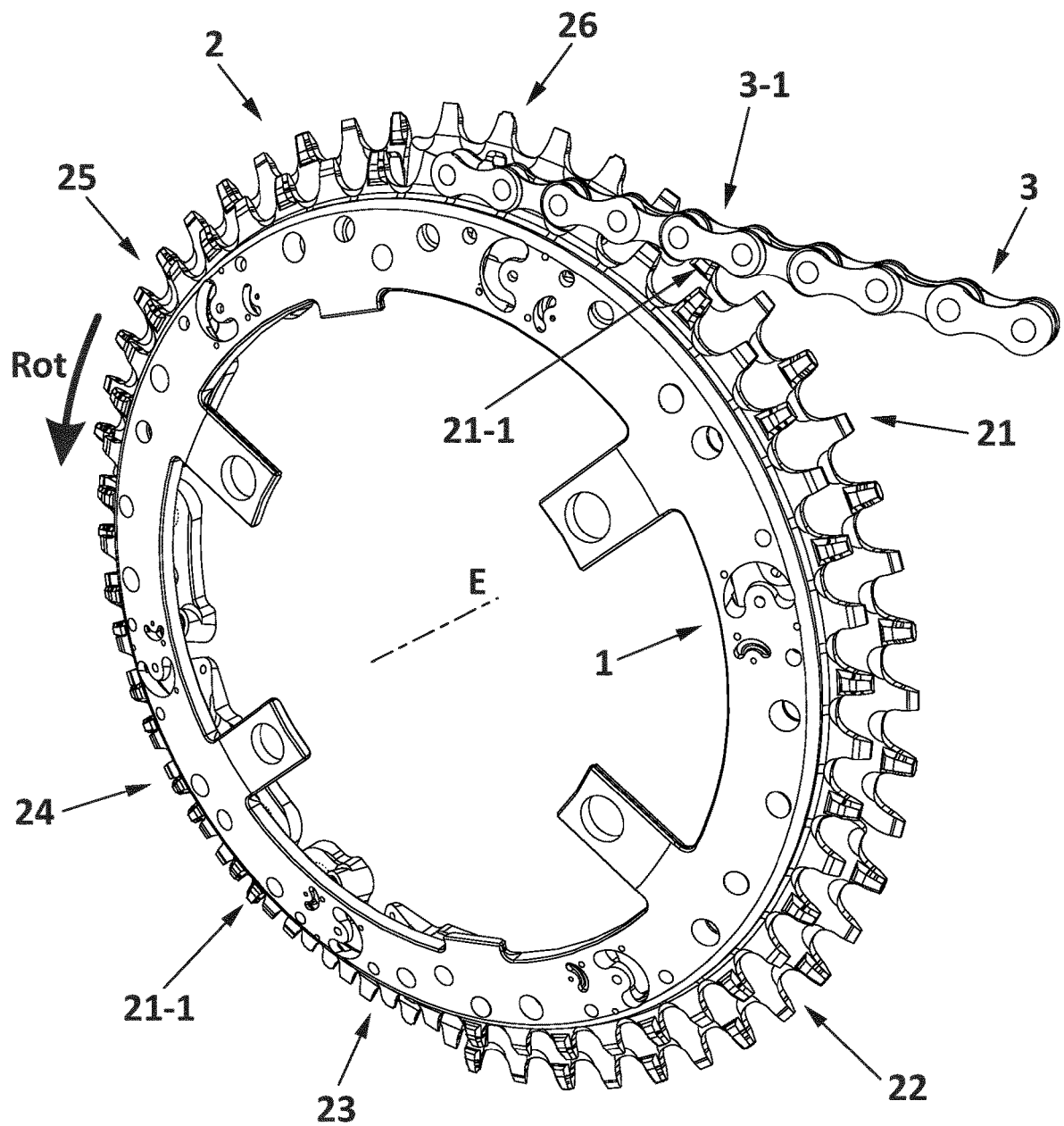
FIG. 10 shows the set composed of a small chain-ring, a big chain-ring and a chain in the configuration for shifting from the small chain-ring to a big chain-ring.

As shown for example in FIG. 3 or 10, a first segment 21, called up-shift segment, of the segments 21, 22, 23, 24, 25, 26 has a first tooth 21-1 which is the first that is engaged with the chain 3 in the rotation movement Rot. Although it is represented in the bottom part of FIG. 3, what occurs in the top part is what is shown. What is intended in this image is to represent both the process of up-shifting and down-shifting.

Throughout the whole description, up-shift is understood as the process leading chain 3 from a configuration of engaging in the small chain-ring 1 to a position of engaging in the large chain-ring 2, and down-shifting is understood as the opposite process. Concordantly, up-shift segments 21 are understood as those specifically designed for up-shifting, and they are the first to come into contact with the chain when an up-shift occurs. The process of up-shifting comprises sequentially move all the segments 21, 22, 23, 24, 25, 26 that are positioned away from the small chain-ring 1 in the chain free zone, starting with the up-shift segment 21, close enough to the small chain-ring 1 for it to engage the chain 3, by means of the said first tooth 21-1, so it will be risen so as to end completely seated in the larger chain-ring 2, after approximately one chain-ring turn.

Instead, the down-shift segments 22 are those designed to down-shifting, and are the last to be in contact with the chain when the down-shift occurs. The process of down-shifting comprises sequentially move all the segments 21, 22, 23, 24, 25, 26 that are engaged close to the small chain-ring 1, in the chain free zone, starting with the segment 23 that follows the down-shift segment 22 in a position away from the small chain-ring 1, such that the chain 3 will keep engaged in the last tooth 22-1 of the down-shift segment without engaging with the segments subsequent to the second chain-ring 2, and transmitting the force to the chain 3 in the rotation Rot while the line of chain goes down along the angular position of the tooth 22-1, until the chain 3 is at the same height as the first chain-ring 1 starts engaging with it.

According to one aspect of the disclosure and as shown in the FIG. 10, the displacement means are configured for moving the up-shift segment 21 to an engaging position such that the first tooth 21-1 can engage with a link 3-1 of the chain 3, called engagement chain-link 3-1 of the up-shift section 31, when the chain 3 is engaged in the small chain-ring 1.

This engaging is carried out, according to an aspect of the disclosure and as shown in FIGS. 10, 13, 14 and 15, without the support part S21 of the up-shift segment 21 reaching the same plane than the support part S1 of the first chain-ring 1.

After the displacement of the up-shift segment 21, the remaining segments 22, 23, 24, 25, 26 will have to be successively displaced to an engaging position with the chain 3, also without the support parts S22, S23, S24, S25, S26 reaching the same plane than the support part S1 of the first chain-ring 1. The displacement of the segments is produced in the chain free zone, such that the segment and therefore its first tooth is close to the first chain-ring 1 by the time the first tooth of the segment will be at the same height as the chain 3, and so it will engage with the chain 3. Once all the segments will be engaged, a second chain-ring 2 has been formed in the position close to the first chain-ring 1 that defines the position of normal operation of the second chain-ring 2 shown in FIG. 11.

Figure 22:
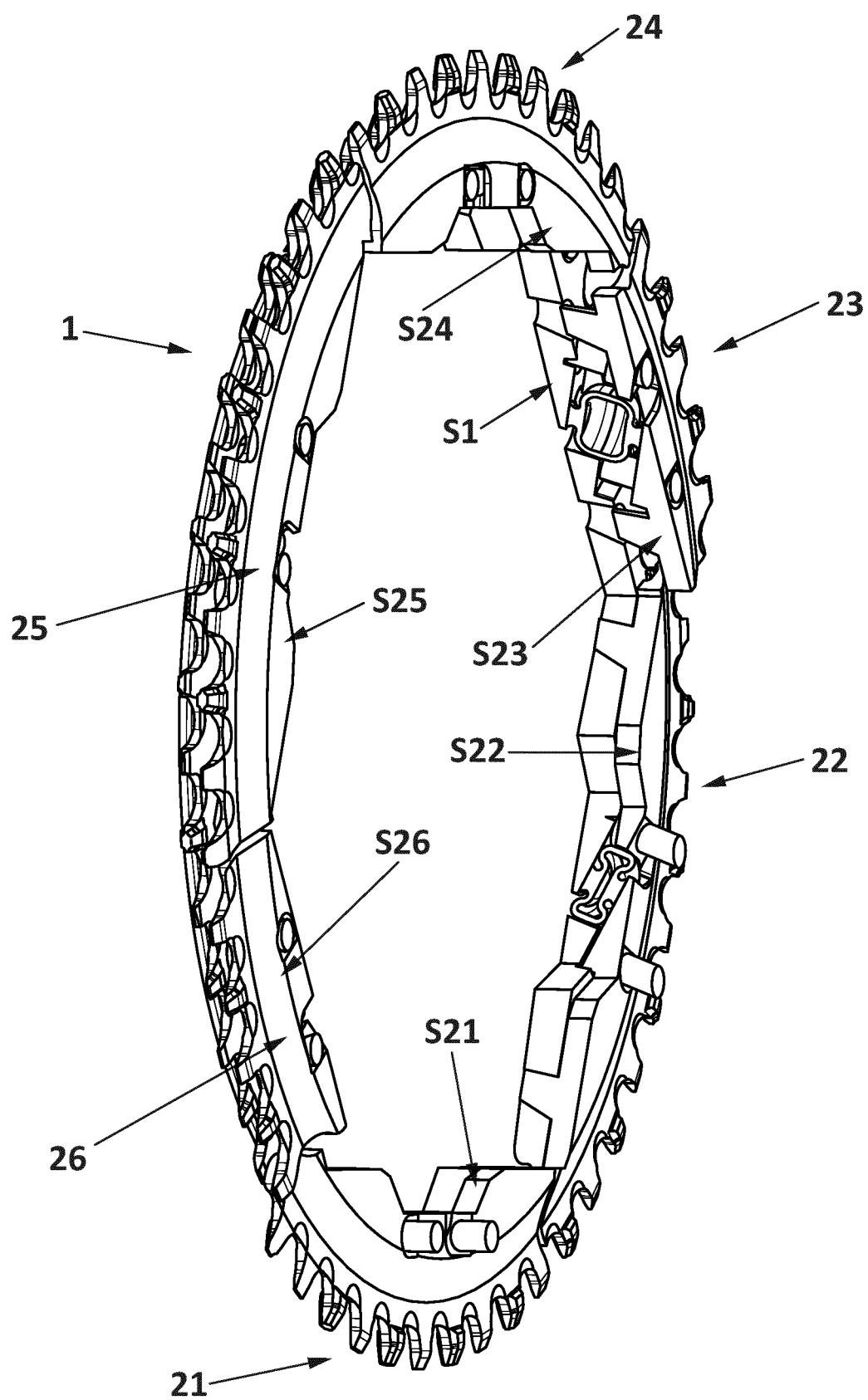
FIG. 22 shows the cut of the first and the second chain-ring set wherein it is observed the connection between the support parts of both.

As shown for example in FIG. 22, the support parts S21, S22, S23, S24, S25, S26 of the segments 21, 22, 23, 24, 25, 26 are supported by the support part S1 of the first chain-ring 1. With which a compact and firm support for the segments 21, 22, 23, 24, 25, 26 is achieved using the same resistant structure of the first chain-ring 1, to support the tensions and the forces to be transmitted, thus achieving a compact structure and taking the same strong structure of the first chain-ring 1 for supporting the tensions and the forces to be transmitted, thus achieving a highly resistant, compact and light structure.

The first 1 and second 2 chain-rings have an even number of teeth, and the engagement chain-link 3-1 of the up-shift section is a wide link, as depicted in FIG. 10, such that the larger internal space of the link ensures a good engaging with the first tooth 21-1 of the up-shift segment 21 in the shift from the first chain-ring 1 to the second chain-ring 2, despite the chain 3 does not centrally contact because it arrives from the first chain-ring 1, which is in a different plane.

FIG. 3 shows how the up-shift segment 21 is angularly arranged in a specific position with respect to the first chain-ring 1 so the starting from a situation wherein the chain 3 is engaged in the last tooth 1-1 of the first chain-ring 1 with a determined direction, the rotation Rot of the chain-rings 1, 2 involves that the engagement chain-link 3-1 of the up-shift section 31 of the chain 3 contacts the front flank FF21-1 of the first tooth 21-1 of the up-shift segment 21. It is important to point out that the contact of any roller R3-1, R3-2 of the links 3-1, 3-2 of the up-shift sections 31 of the tensed chain 3 is produced in the frontal flanks FF21-1, FF1-1 of the teeth 21-1, 1-1 of the chain-rings 1, 2. The frontal flanks of the teeth are approximately tangential to the chain 3, such that the pressure of the roller on the tooth is carried out approximately in a normal direction, this being the most efficient way of transmitting the force between the chain-ring and the chain. In this way, the result is that the transmission force during the shifting process is as efficient as during the transmission in the first chain-ring 1 or second chain-ring 2, thus implying that the accuracy, smoothness, and the efficiency of the shift from chain-ring of this disclosure will be superior than in the known prior art.

Figure 4:
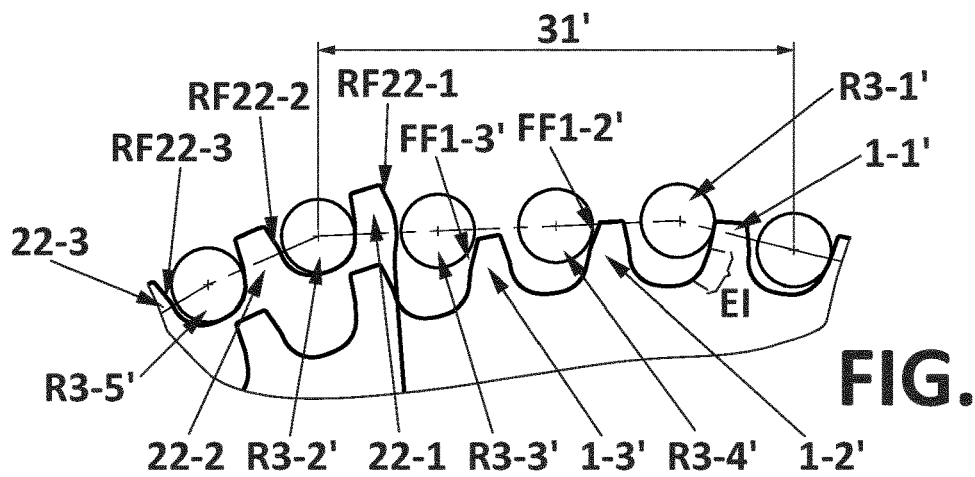
FIG. 4 is a zoom of the engagement of the chain in a down shift from a big chain-ring to a small chain-ring.

The disposition of the front flanks also enables the seating of the chain 3 towards the preferred engagement interval EI of the chain-ring teeth 1 and 2, such as shown in FIG. 4. In such a way the duration of phase III is reduced and a faster shifting process is achieved. The counterpoint being that, as previously mentioned, due to the specialization of the segments, the shifting process can only be started in specific points of the pedalling cycle, such that, at times, this wait can significantly delay the execution of the shift.

According to a particularly preferred embodiment shown in FIGS. 9 to 12, the second chain-ring 2 has four more teeth than the first chain-ring 1. In this case the number of teeth of the chain-rings 1, 2 is even.

Figure 1:
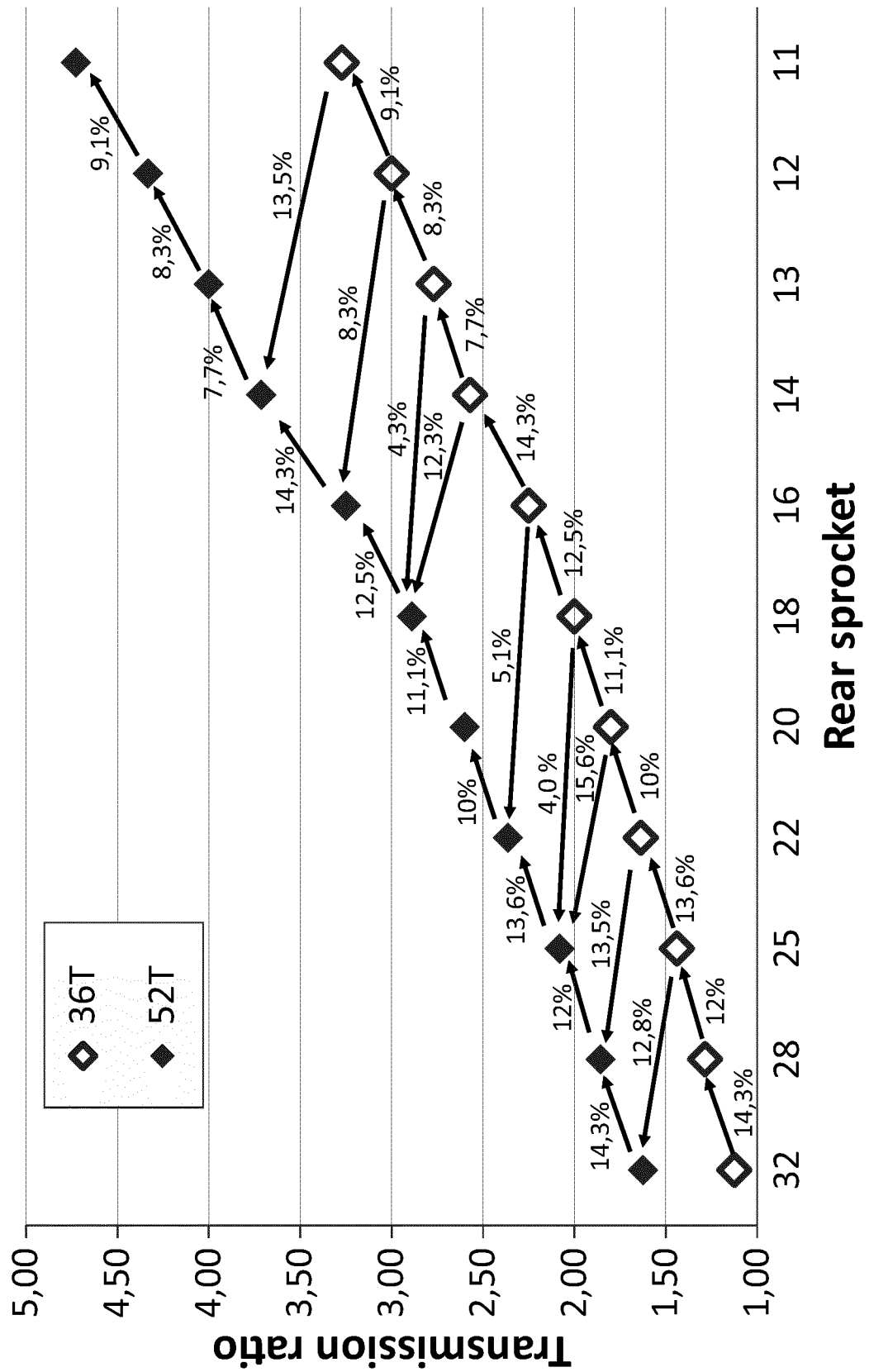
FIG. 1 shows the transmission relations and the shifting strategies mainly used in the state of the art.
Figure 2:
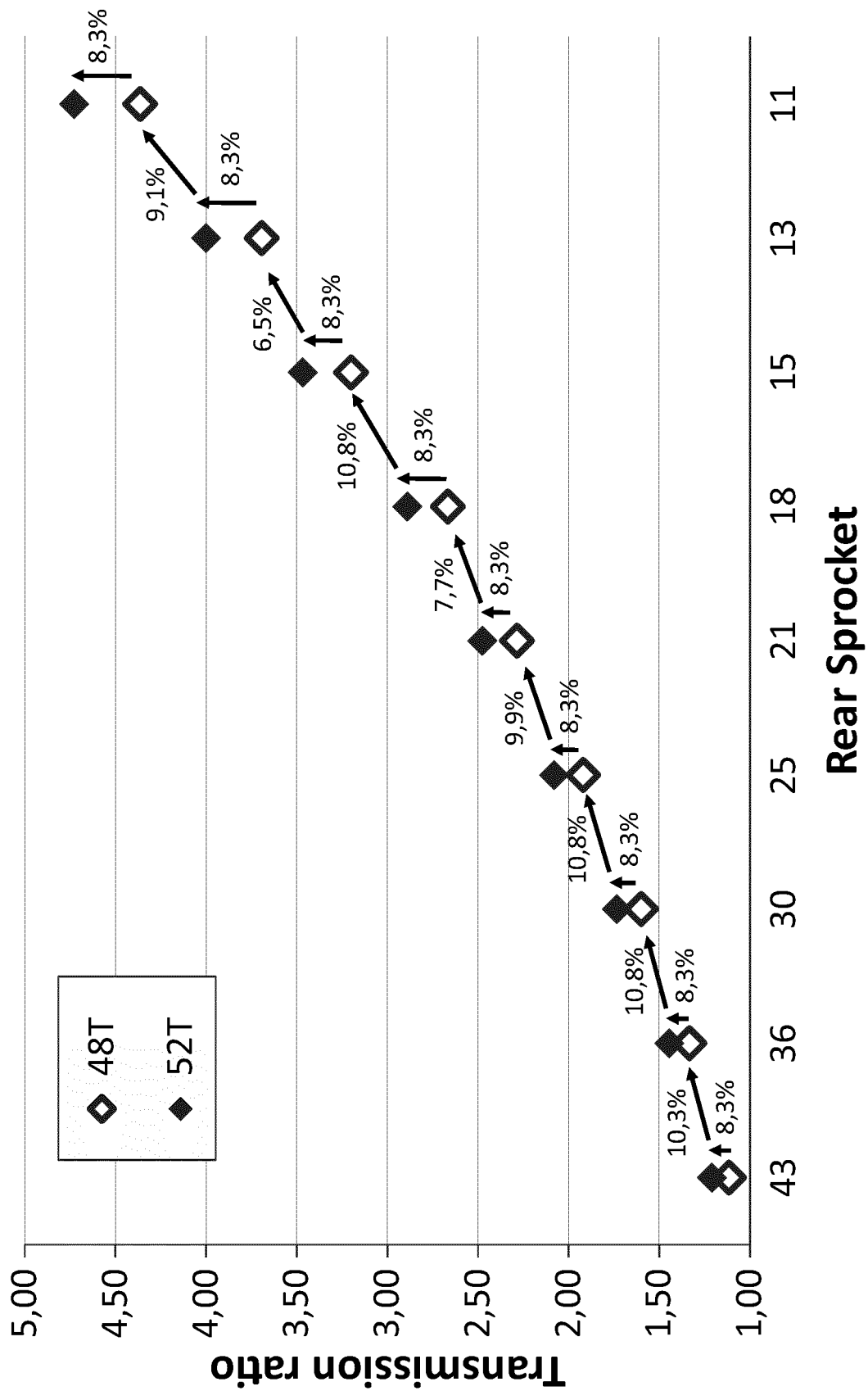
FIG. 2 shows the transmission relations and the strategy for shifting from the "half-step" that is proposed.

In this way strategies for shifting from the "half-step" can be applied, such as those shown in the FIG. 2. with two chain-rings of 48 and 52 teeth, and 9 rear sprockets having 11 to 43 teeth, 18 relations are obtained, all useful, that cover the same range than a common transmission of FIG. 1 but with more uniform steps between 7.7 and 10.8%. This shifting strategy presents a better amplitude of the transmission relations and a more simple and clear shift logic.

In the preferred configuration the shift from chain-rings and rear sprockets will have an electronic control in which an activation sequence is defined to follow the "half-step" shifting strategies defined according to the simple orders of the cyclist from a bigger or a lower relation. The control of the chain-rings shifting will also imply a position sensor for controlling that the chain-ring shifts are initiated with the appropriate segment.

Figure 13:
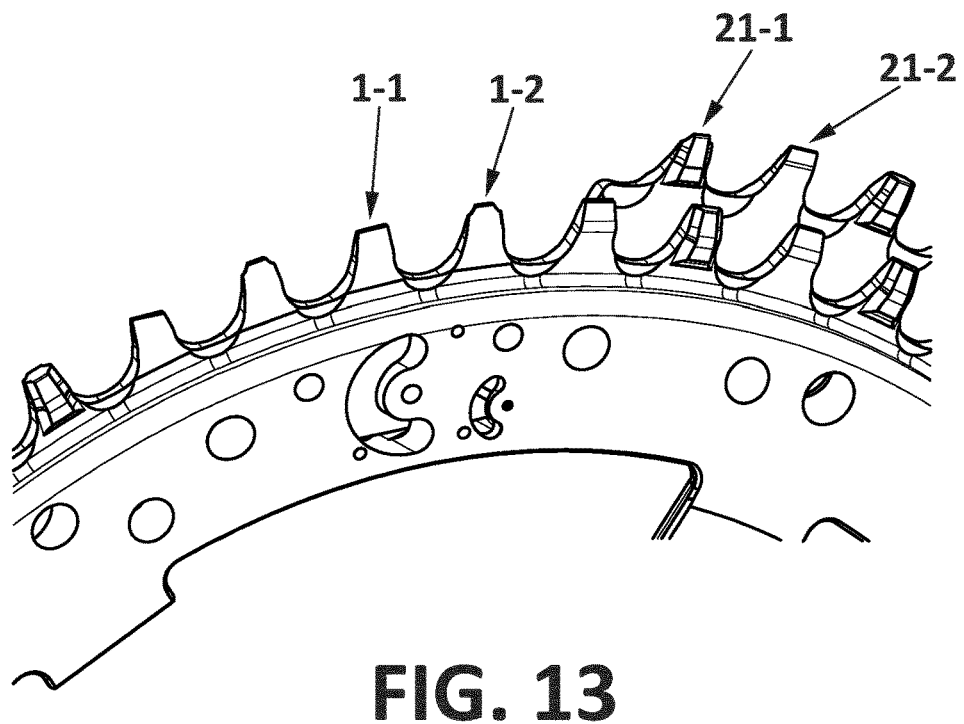
FIGS. 13 to 15 show in detail the first chain-ring and the up-shift segment in the area for shifting from the first chain-ring to the second chain-ring from different angles.
Figure 14:
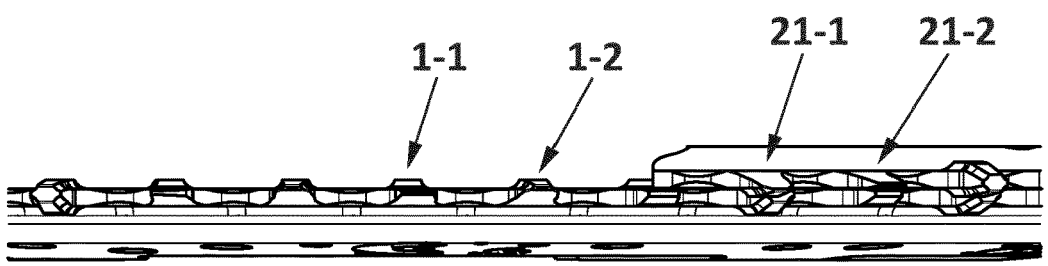
Figure 15:
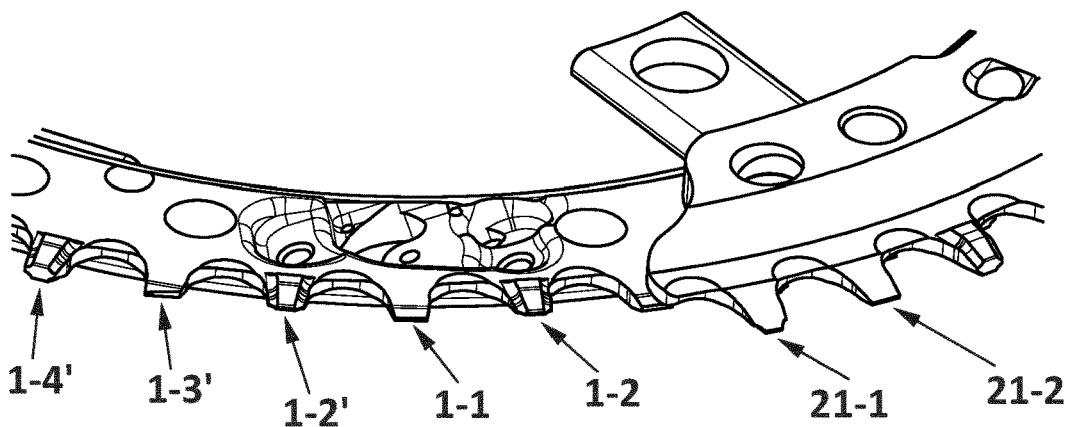

A possibility to improve the engagement of up-shift is that the first tooth 21-1 of the up-shift segment 21 has its superior end displaced with respect to the medium plane of the support part S21 towards the side corresponding to the first chain-ring 1, as depicted in FIGS. 13 to 15. It can also be seen that the first tooth 21-1 is recessed in its side opposite to the first chain-ring 1, such that a surface for guiding the chain to the engaged configuration is defined.

This characteristic can be reproduced in the following teeth 21-2, as depicted in FIGS. 13 a 15, such that surfaces for progressively guiding the chain to the engaged configuration are defined, wherein it has to be considered whether the contact is produced in a wide or narrow chain-link.

In the same FIG. 13 a 15 it also can be seen that the teeth 1-1 and 1-2 of the first chain-ring 1 intervening in the shifting process illustrated in FIG. 3 are also displaced towards the other chain-ring (second chain-ring 2 in this case) with the opposite side lowered, with the purpose for the chain 3 to be in a position more towards the second chain-ring 2 before starting the shifting, and to allow a displacement of the chain 3 more towards the second chain-ring 2 when the chain 3 will engage in the teeth 21-1 and 21-2 of the up-shift segment 21.

It is noteworthy that the displacements of these teeth 1-1, 1-2, 21-1 and 21-2 do not go further than the internal space of the links of the associated chain 3, such that they do not affect the engaging in the transmission subsequent to the change in the first chain-ring 1 or second 2 chain-ring.

Features of the disclosure concerning the down-shifting area are described below.

Figure 12:
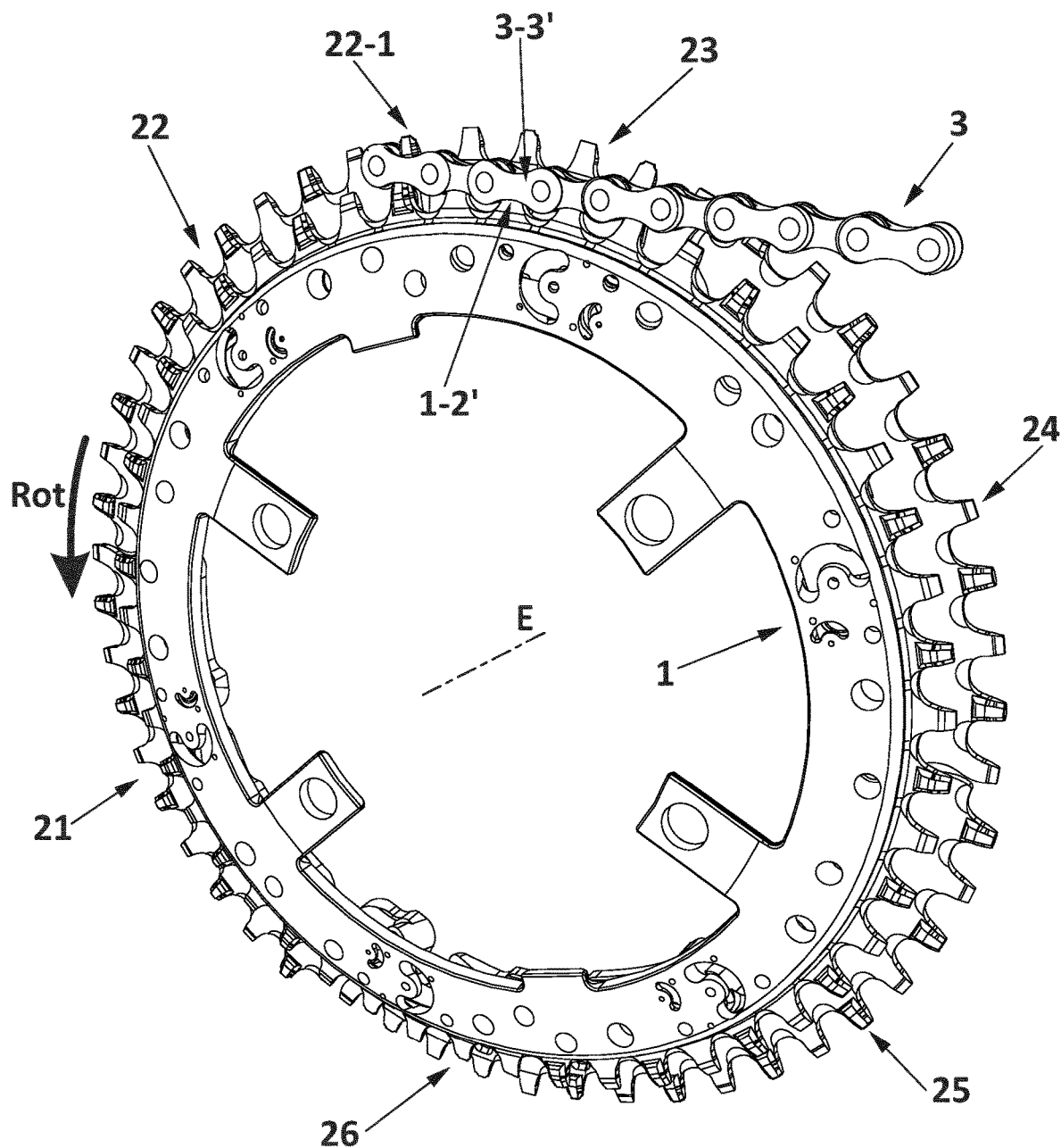
FIG. 12 shows the set composed of a small chain-ring, a big chain-ring and a chain in the configuration for shifting from the big chain-ring to small chain-ring.

As shown in FIG. 3 or 12, a second segment 22 of the segments 21, 22, 23, 24, 25, 26, called down-shift segment 22, has a last tooth 22-1 which is the last tooth engaging with the chain 3 in the rotation movement Rot in the second chain-ring 2.

In this case, the displacement means are configured to simultaneously:

Lead a third segment 23, called complementary segment 23, out of the engaging position, to allow the chain 3 'down-shift' to the chain-ring 1, as shown in FIG. 12; and bring the up-shift segment 22 to a configuration wherein as shown in FIG. 3:

the last tooth 22-1 is engaged with a link 3-2' of the chain 3, called engaged chain-link 3-2' of the down-shift section 31'; and a link 3-1' of the down-shift section 31', called engagement chain-link 3-1' of the down-shift section 3-1', is engaged in a tooth of the small chain-ring 1, called first tooth 1-1' of the first chain-ring 1, And all of it without the support part S22 of the down-shift segment 22 reaching the same plane as the support part S1 of the first chain-ring 1.

The complementary segment 23 is not an up-shift segment, understood as the one that initiates the up-shift, neither a down-shift, which is the one that initiates a shift to a small chain-ring, but is a segment intended to segment even more the chain-ring, for example to limit the size of the segments.

Figure 5:
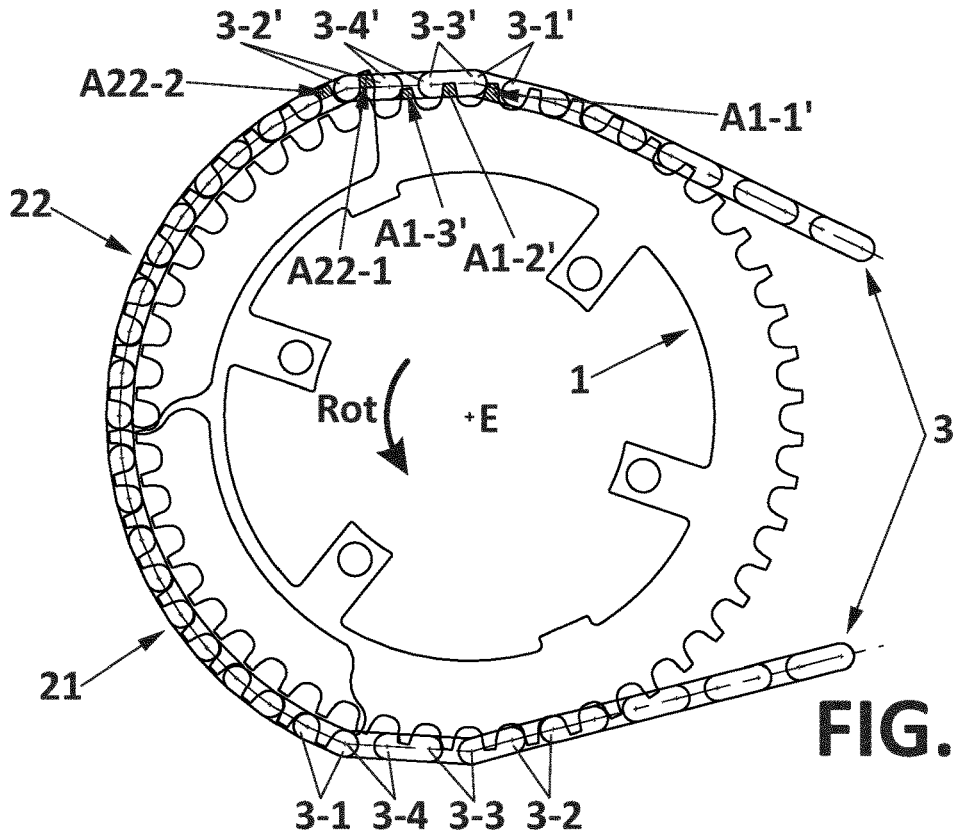
FIG. 5 shows the progressive seating of the chain in the small chain-ring and big chain-ring set, both in a shift from small chain-ring to a big chain-ring and a shift from a big chain-ring to a small chain-ring.

In a similar way and as shown in the FIGS. 5 and 12 the centering link 3-3' subsequent to the engaged chain-link 3-2' of the down-shift section 31' wherein the seating area A1-2' is higher than the 50% of the complete seating area A22-2 when the engaging roller R3-1' of the down-shift section 31' contacts the front flank FF1-1' of the first tooth 1-1' of the first chain-ring 1 in a configuration for shifting from the second chain-ring 2 to the first chain-ring 1, the so-called centering link 3-3', is also a wide link. So, the bigger inner space of the link ensures a good contact of the centering tooth 1-2', despite the chain 3 does not centrally contacts due to the fact that it comes from the second chain-ring 2 which is in a different plane. Following, a partial engagement between the centering link 3-3' and centering tooth 1-2' which displaces the chain 3 towards the plane of the first chain-ring 1, such that the engagement chain-link 3-1' is aligned with the first tooth 1-1' of the first chain-ring 1 for its subsequent engagement. FIG. 3 also shows that the same angular disposition between the first chain-ring 1 and the second chain-ring 2, and according to the specific segmentation proposed for the second chain-ring 2 carries a segment position down 22 respect to the first chain-ring 1 wherein starting from a new situation in which the chain 3 is engaged in the last tooth 22-1 of the down-shift segment 22 with a new determined direction, the rotation Rot of the chain-rings 1, 2 implies that the engagement chain-link 3-1' of the down-shift section 31' of the chain 3 contacts the front flank FF1-1' of the first tooth 1-1' of the first chain-ring 1.

It is important to point out that the contact of any roller R3-1', R3-2' of the links 3-1', 3-2' of the down-shift sections 31' of the tensed chain 3 is produced in the frontal flanks FF1-1', FF22-1' of the teeth 1-1', 22-1' of the chain-rings 1, 2. The frontal flanks of the teeth are approximately tangential to the chain 3, such that the pressure of the roller on the tooth is carried out approximately in a normal direction, this being the most efficient way of transmitting the force between the chain-ring and the chain 3. In this way, what is obtained is that the force transmission during the shifting process is as efficient as during the transmission in the first chain-ring 1 or second chain-ring 2, thus implying that the accuracy, smoothness, and efficiency of the shift from chain-ring of this disclosure will be superior than in the known prior art.

Figure 16:
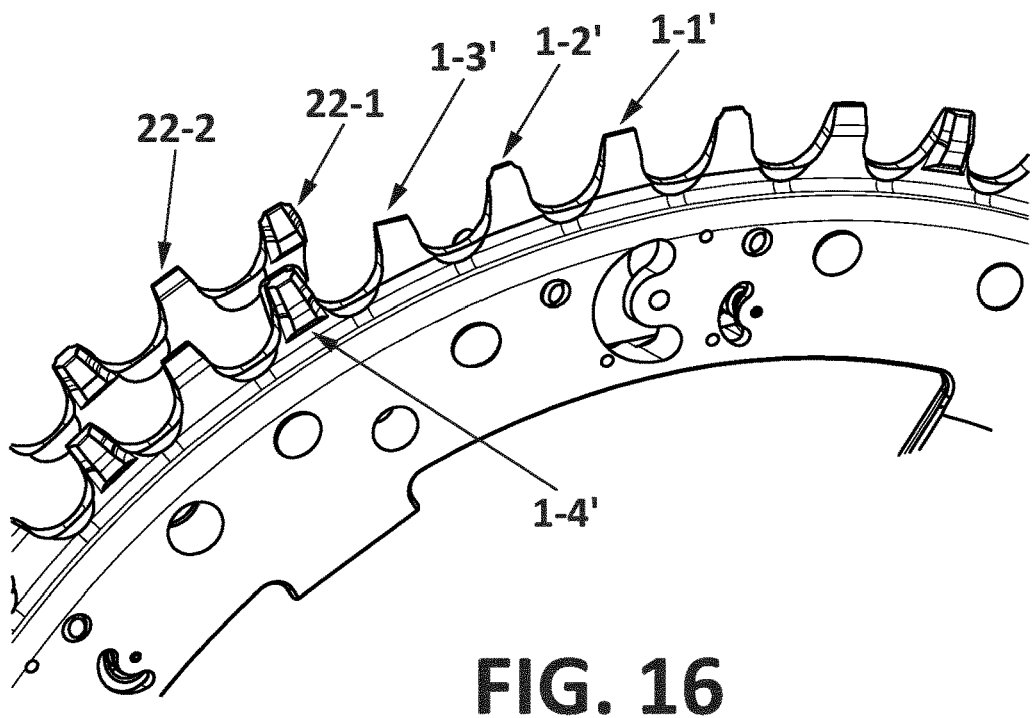
FIGS. 16 to 18 show in detail the first chain-ring and the down-shift segment in the area for shifting from the second chain-ring to the first chain-ring from different angles.
Figure 17:
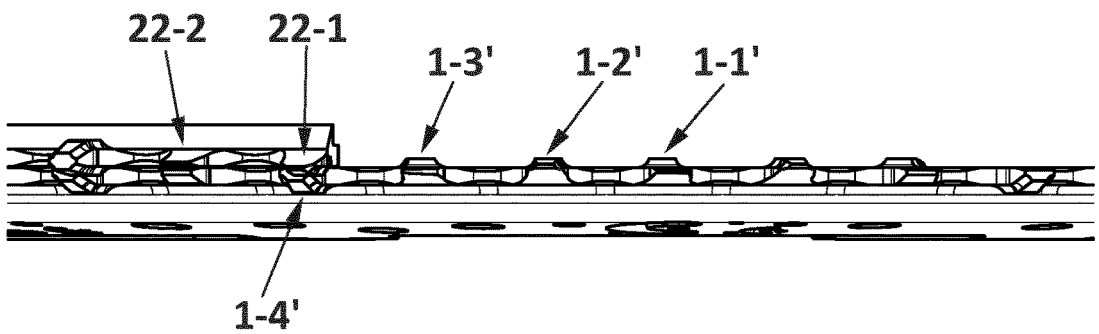
Figure 18:
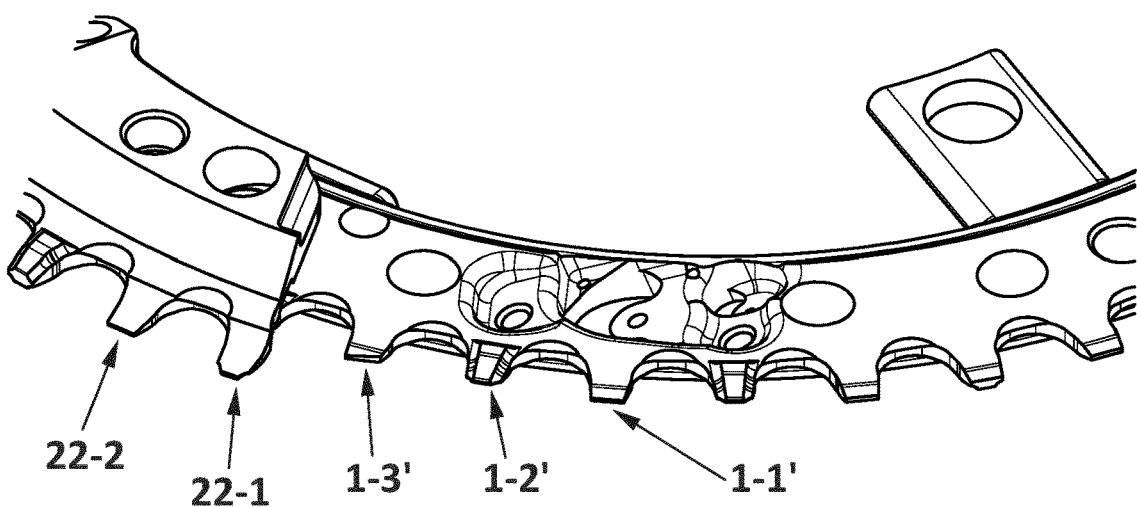

To facilitate the shift from big chain-ring 2 to small chain-ring 1 the concept of a set of asymmetric teeth progressively guiding the chain from a chain-ring to another also applies. Specifically, as shown in FIGS. 16 a 21, the teeth 1-1', 1-2', 1-3' of the first chain-ring 1 have their superior end displaced with respect to the medium plane of the support part S1 of the first chain-ring 1 to the second chain-ring 2, and they are, furthermore, cut down in the opposite side to facilitate the engagement of the chain 3 and change the operating plane as it engages, and the teeth 22-1, 22-2 of the second chain-ring 2 have their superior end displaced with respect to the medium plane of the support part S22 of the down-shift segment 22 to the first chain-ring 1, and they are, furthermore, cut down in the opposite side to start the shifting process with the chain as close as possible to the first chain-ring 1, and facilitate the shift from operating plane of the chain 3.

It is necessary to emphasize on the fact that the displacements of these teeth 1-1', 1-2', 1-3', 22-1 and 22-2 do not go further than the inner space of the associated links of the chain 3, such that they neither affect the engaging nor the transmission subsequent to the shift in the first chain-ring 1 or second chain-ring 2.

Figure 19:
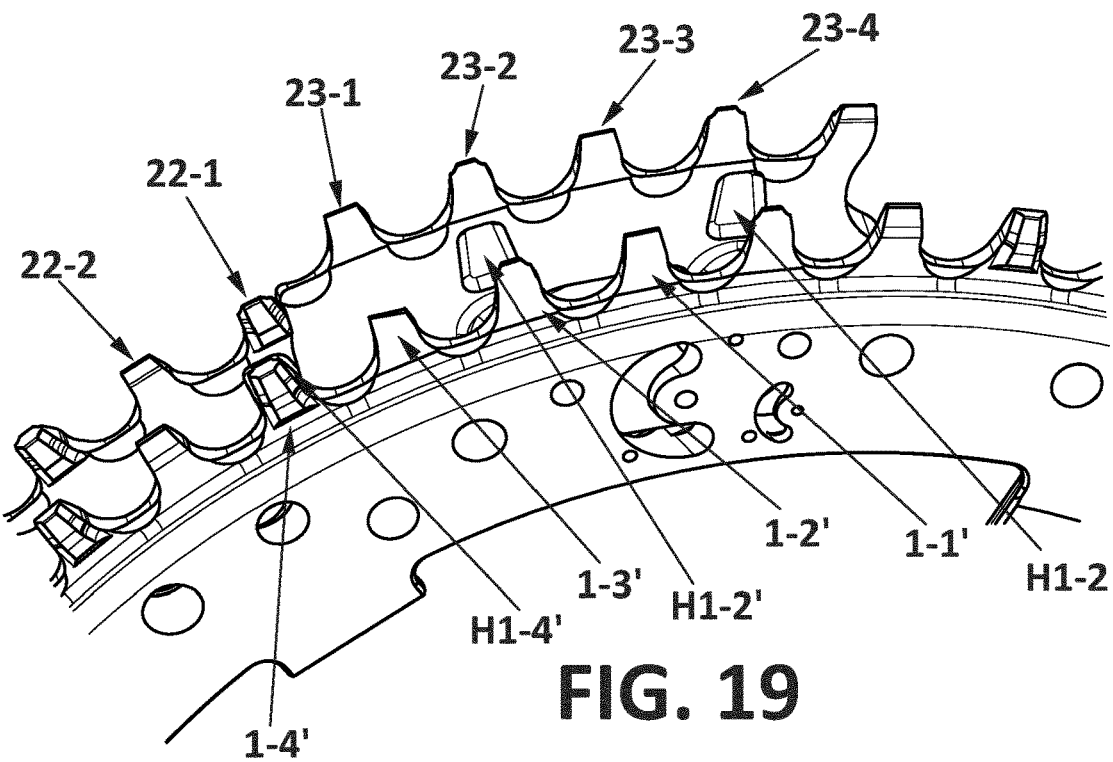
FIGS. 19 to 21 show in detail the first chain-ring, the down-shift segment and the complementary segment in the area for shifting from the second chain-ring to the first chain-ring from different angles.
Figure 20:
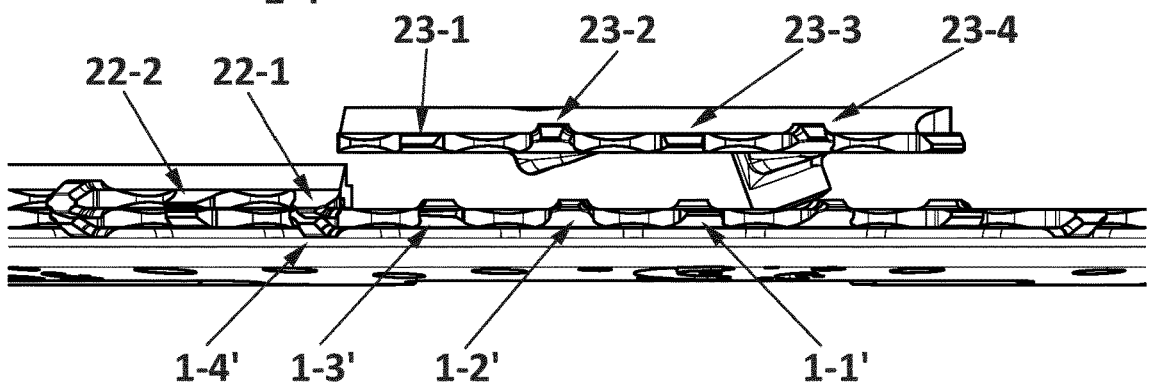
Figure 21:
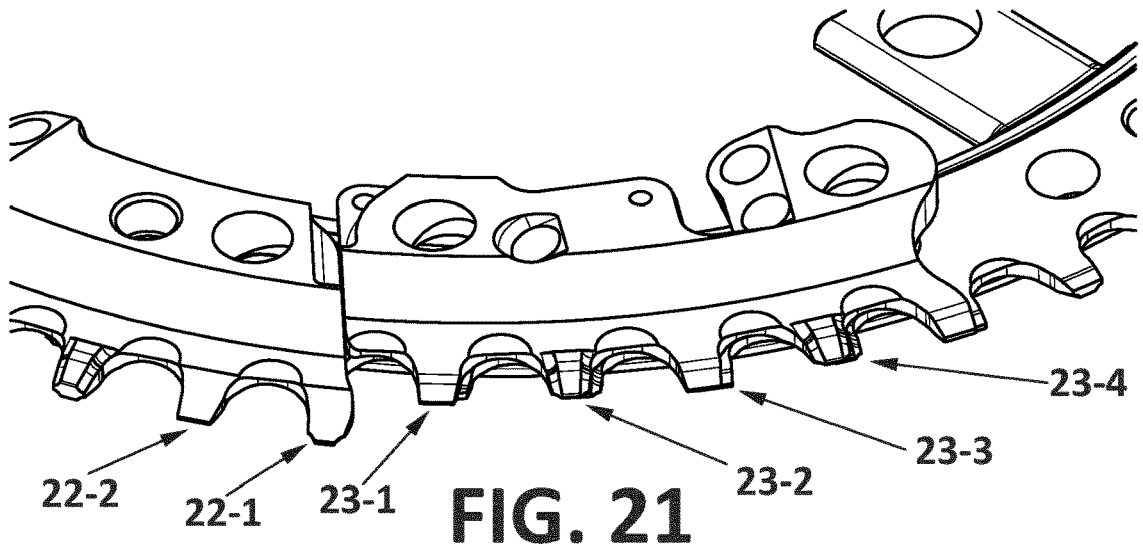

Additionally, for the process of shifting from the second chain-ring 2 to the first chain-ring 1, besides modifying the teeth of the down-shift segment 22 and the first chain-ring 1 engaging with the chain 3 in this shifting process for better engagement, also the teeth of the complementary segment 23 are modified for preventing the engagement of the chain 3 in this shifting process. Specifically, as shown in FIGS. 19 a 21 the first teeth 23-1, 23-2, 23-3, 23-4 of the complementary segment 23 are cut down in the side of the first chain-ring 1 to avoid the engagement of the chain 3 in this complementary segment 23 and a surface for guiding the chain 3 towards the engaging plane in the first chain-ring 1 is defined.

To achieve the mentioned force transmission properties it is necessary to avoid any contact of the chain 3 with the chain-rings 1, 2 different to the previously indicated as shown in FIG. 4. In this regard, the segmentation cut of the down-shift segment 22 prolongs the rear flank RF22-1 such that it does not interfere with the roller R3-3' subsequent to the engaged roller R3-2' of the down-shift section 31' in the position for shifting from the second chain-ring 2 to the first chain-ring 1. And the front flanks FF1-2', FF 1-3' of the teeth 1-2', 1-3' prior to the first tooth 1-1' of the first chain-ring 1 are cut down so as not to interfere with the rollers R3-4', R3-3' of the down-shift section 31' of the chain 3 subsequent to the engaged roller R3-2' of the down-shift section 31' and prior to the engagement roller R3-1' of the down-shift section 31' in the position for shifting from the second chain-ring 2 to the first chain-ring 1. It is important that any cut down of the frontal flanks is carried out above the engagement interval EI, such that this cut does not affect the engagement of the chain in configurations not for shifting from the transmission in the first chain-ring 1 and the second chain-ring 2.

To further improve the behaviour during the shift-down and as seen in FIG. 5, a tooth 1-3' having a partial engagement lesser than 50%, called interfering tooth 1-3', can have the height cut down by an oblique cut as shown in FIGS. 16 to 21, aimed to avoiding interference with the chain 3 in the shifting processes from the first chain-ring 1 to the second chain-ring 2 or from the second chain-ring 2 to the first chain-ring 1.

In FIG. 5 the tooth 1-3' of the first chain-ring 1 closer to the last tooth 22-1 of the segment 22 would have a minimum contact with the chain 3, with what the result is an optimum tooth to guide the chain 3 towards the operating plane of the first chain-ring 1. In this regard, it is even more interesting to cut down this interfering tooth 1-3' such that it will not have any contact with the chain and to make the first contact and the guiding by means of the following tooth 1-2' that largely engages, but not completely, with the chain 3.

As it can be seen in FIG. 15, the interfering tooth 1-3' and adjacent 1-2' and 1-4' have an over-thickness towards at least one side and preferably towards both. The cut down of the tooth 1-3' can facilitate the fall off of the chain 3 on that point through vibrations while operating, in the first chain-ring 1, therefore it is preferable to adjust the thickness of the teeth to the available space in the corresponding links of the chain 3 to improve the guidance.

With the same purpose of a better guidance and stability against vibrations the other teeth not implicated in the shifting process coinciding with wide links of the chain 3 can have an over-thickness towards at least one side, and preferably both sides.

Figure 11:
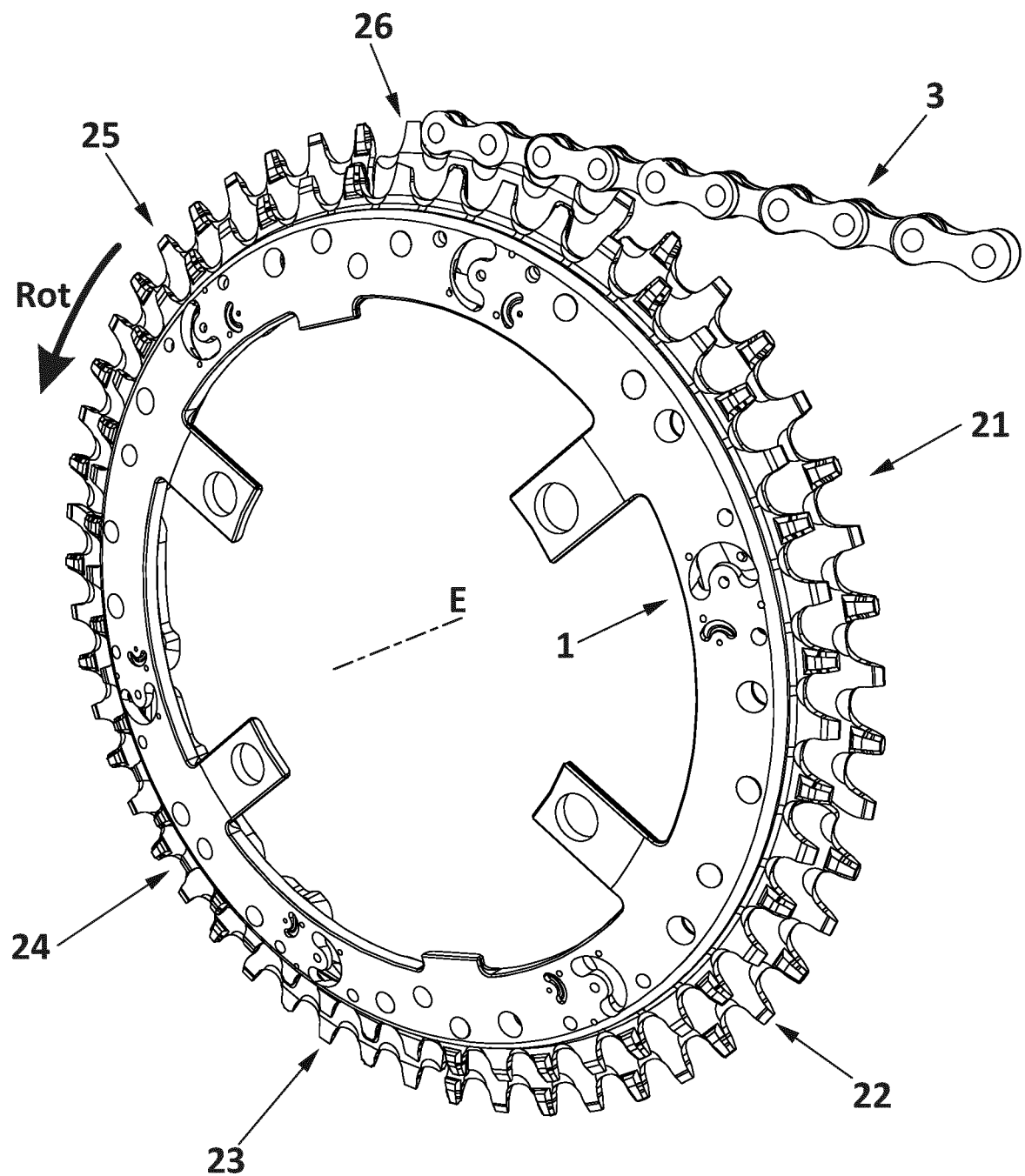
FIG. 11 shows the set composed of a small chain-ring, a big chain-ring and a chain in the configuration wherein the power is transmitted through the big chain-ring.

In the configuration of power transmission in the second chain-ring 2, FIG. 11, the support parts S21, S22, S23, S24, S25, S26 of the segments 21, 22, 23, 24, 25, 26 are very close to the support part S1 of the first chain-ring, so they will collide with the part of the tooth T1 of the first chain-ring 1 if the teeth of this first chain-ring 1 have an over-thickness towards the second chain-ring 2. In order to avoid this collision, the second chain-ring 2 has cavities H1-2, H1-2', H1-4' for housing the teeth 1-2, 1-2', 1-4' of the first chain-ring having over-thickness towards the side of the second chain-ring 2 as shown in FIGS. 8 and 19.

Figure 6:
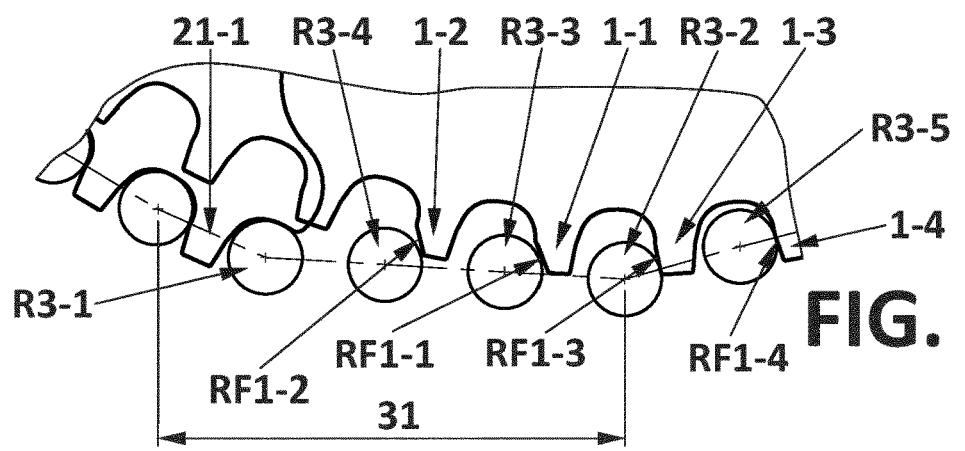
FIG. 6 is a zoom of the seating of the chain in the area for shifting from the up-shifting from the small chain-ring to the big chain-ring in the moment of unseating.

The proposed disclosure, besides improving the engagement or seating of the chain in the area for chain-ring shifting, also brings an improvement of the unseating in the same area. As previously explained, the roller that engages any tooth in the engagement interval EI of the tooth will progressively move along the pedalling cycle, down-shifting to the valley to subsequently even detach itself from the front flank and head to the rear flank before the unseating moment. The same occurs in the shift area that affects both chain-rings 1, 2, but in this area, since the contact is produced in a point more external of the front flank FF21-1 or FF1-1', the displacement of the roller R3-1 or R3-1' is larger during the pedalling cycle, with what it pushes the previous rollers against the rear flank of the previous tooth in a way different from the non-shifting configuration, and that could imply problems in the unseating of those rollers and, in this regard, it may be desirable that the last tooth 22-1 of the down-shift segment 22 and/or any of the previous teeth 1-1, 1-2, 1-3, 1-4 to the first tooth 21-1 of the up-shift segment 21 have a recess in the rear flank RF22-1, RF1-1, RF1-2, RF1-3, RF1-4 so as not to interfere with the rollers R3-3', R3-3, R3-4, R3-2, R3-5 of the chain 3 in the moment of unseating of the chain 3 of the chain-ring 1, 2 in any shift position, as shown in FIGS. 4 and 6.

Even though the properties of an up-shift segment 21 and a down-shift segment 22 have been described, it is possible to arrange more up-shift segments 24 and down-shift segments 25 in the second chain-ring 2 with the same features, for example, symmetrically in FIGS. 8 to 12 where complementary segments 23 and 26 that complete the big chain-ring 2 can also be seen.

A special feature to be highlighted about the particular case of a first chain-ring 1 of 48 teeth and a second chain-ring 2 of 52 teeth and segmented according to what is illustrated in FIGS. 3 to 22 with two up-shift segments 21 and 24, and two down-shift segments 22 and 25, is that the last teeth 1-1 of the first chain-ring 1 are the same as the first teeth 1-1' of the first chain-ring 1. The same happens in the oval chain-rings of the same size as in FIG. 23.

Figure 23:
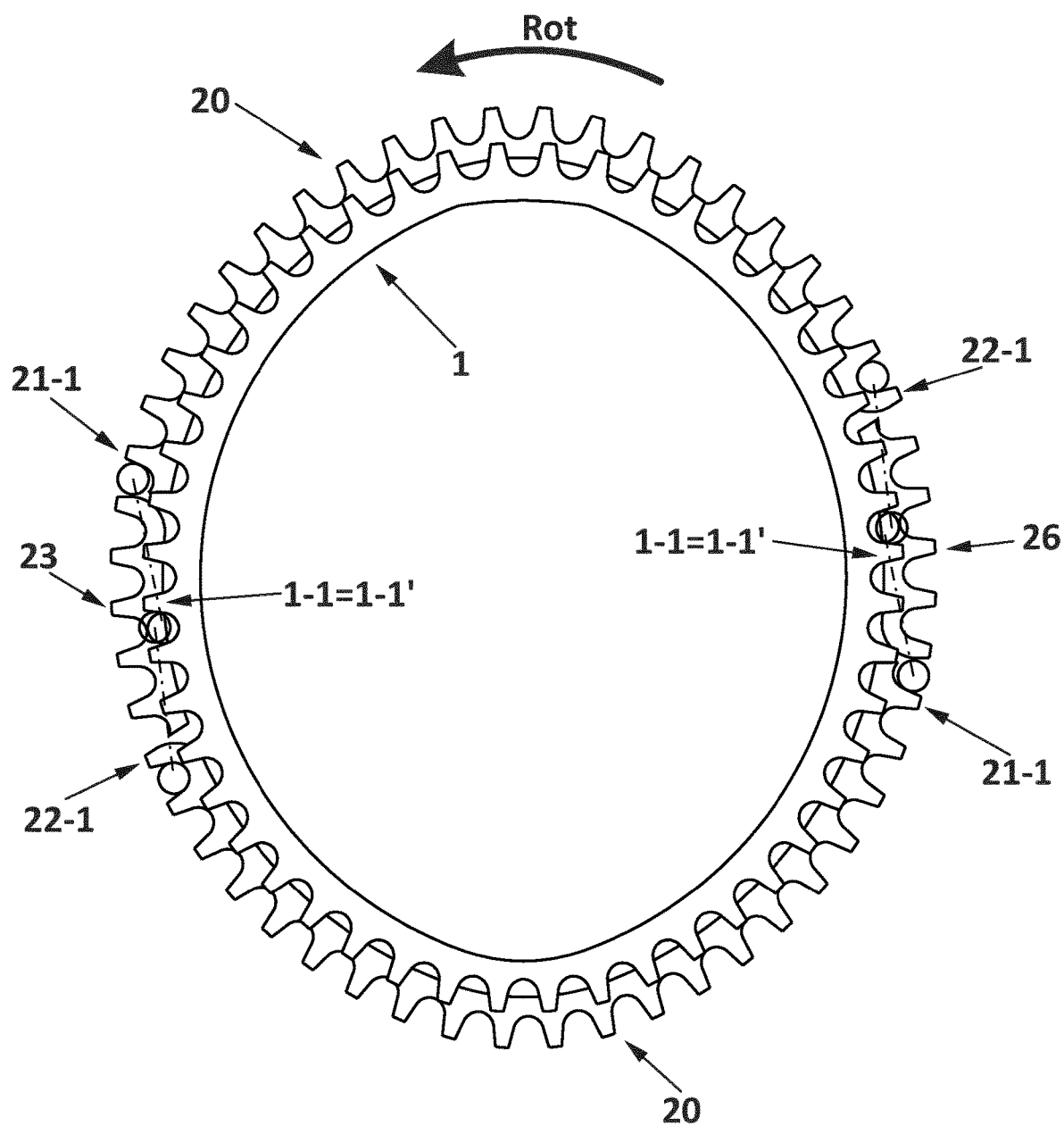
FIG. 23 shows that the inventive concepts can also be applied to a chain-rings set having variable radius, in this case oval chain-rings.

It is to be emphasized that all these features are perfectly applicable to chain-rings with variable radius and, very particularly to oval chain-rings, such as the one show in FIG. 23. In fact, the advantages of the proposed disclosure are even bigger in non-circular chain-rings, due to the fact that the smoothness, precision and reliability is the same as in round chain-rings, opposed to the conventional derailleurs in which the behaviour is always worse with non-circular chain-rings.

As shown in FIG. 23, it is possible to make that the up-shift segment 21 and the second down-shift segment 22 are the same shifting segment 20.

The important part of an up-shift segment 21-24 is the initial cut, that favours an optimum shift of the small chain-ring 1 to the big chain-ring 2, whereas the important part of a down-shift segment 22-25 is its final cut, which favours an optimum shift of the big chain-ring 2 to the small chain-ring 1. These two cuts could form a single shift segment 20. In other words, it would comprise grouping the up-shift segment 21 with one for down-shifting 22 with possible segments interposed in between. According to the dimensions of both chain-rings and operating conditions, this could be a small segment easy to move, or a big segment that exhibits more problems in its displacement. In the latter case many solutions could be used like using a pulley to increase the chain free zone, carry out the displacement when the final part of the segment is still engaged with the chain 3 in its disengagement such that it laterally moves the chain-ring in the shifting movement, or the case when the segment would have some flexibility such that the starting part subjected to a shift to a bigger chain-ring would be completely moved, whereas the final part subjected by the chain in its disengagement would not move or would move to a lesser extent.

FIGS. 3 and 23 show that the external envelop line LE1 of the first chain-ring 1 is located at a minimum distance from the line base LB of the second chain-ring 2, according to how these lines are defined in FIGS. 7 and 8, this minimum distance being the difference between the radius of the roller and the radius of the outer circular contour of the link. This configuration defines the case with the smallest size difference between the two chain-rings 1 and 2, in which the chain-rings 1 and 2 can be approximated as much as possible without the chain 3 seating on the second chain-ring 2 contacting the first chain-ring 1.

This system for chain shifting-rings is especially designed for bicycle transmissions. However, it can be applied to transmission-based chains of any other machine on any axis (transmitter or receiver axes). Even in the bicycle, although the advantages of the shifting system are more noticeable in the transmitter shaft (chain-rings shift), the shifting system could be applied in the receiver axis (rear sprockets shift). It is also obvious that the proposed shifting system can operate with more than two chain-rings or rear sprockets wherein a big segmented chain-ring would function as a first non-segmented chain-ring for a segmented chain-ring even bigger. In the present description the application of the disclosure to a two chain-rings set has been described. However, many of the concepts presented here can be generalized to sets of three or more chain-rings. In that case, for example, all the chain-rings except the smallest would be segmented. Then, for example, in a bicycle four chain-rings (44, 49, 54 and 60 teeth) and four rear sprockets (12, 18, 27 and 41 teeth) could be combined using this technology, resulting in 16 relations covering a wider range than a conventional transmission, but with better staggered hops between 10% and 11.4%.

The concepts described can also be applied to other equivalent configurations and different sizes and can be applied to other fields where a smooth and precise transmission power with multiple relations is needed.

The proposed disclosure corresponds to a system for chain shifting-rings wherein one of the chain-rings is segmented and is displaced with respect to the other, but it resolves the inconvenients associated with the solution proposed in CH-617992-A5.

It innovates in the state of the art in that the proposed segmentation achieves an optimum synchronisation of the chain-rings both in up-shift and in down-shift to minimize phase III of seating, and therefore achieving faster, smoother, more precise and reliable changes of chain-ring.

The proposed disclosure also shows a way to make the segmented shifting systems work with differences of only four teeth between chain-rings with sufficient rigidity and resistance, making them applicable to shifting strategies of the half-step type.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, regarding the choice of materials, dimensions, components, configuration, etc.), within the general scope of the disclosure as defined in the claims.

The invention claimed is:

1. A chain-rings set, for a power transmission system, which comprises a chain, a first chain-ring, a second chain-ring having a common axis with the first chain-ring and provided with more teeth than the first chain-ring, wherein the first chain-ring is formed by a support part of the teeth and a teeth part, wherein the second chain-ring is formed by segments each formed by a support part of the teeth and a teeth part, which comprises axial displacement means of the segments such that they can be moved in an independent manner at least in the direction of the common axis, wherein an up-shift segment of the segments has a first tooth which is the first which is engaged with the chain in the rotation movement;

wherein the teeth of the second chain-ring define valleys between the teeth and wherein the second chain-ring defines a base line passing through the lowest points of the valleys between the teeth of the second chain-ring; in each segment of the segments, the base line separating the teeth part of the segment from the support part of the teeth of the segment;

the displacement means being configured for moving the up-shift segment to an engaging position such that the first tooth can engage with an engaging link of an up-shift section of the chain, when the chain is engaged in the first chain-ring, and without the support part of the up-shift segment reaching the same plane than the support part of the first chain-ring;

the displacement means being configured for successively moving remaining segments to an engaging position with the chain without the support parts of the segments reaching the same plane than the support part of the first chain-ring; and a) the first chain-ring and the second chain-ring having an even number of teeth and wherein the engagement chain-link of the up-shift section of the chain is a wide link; and/or b) the first tooth of the up-shift segment has its tip displaced with respect to the medium plane of the support part of the up-shift segment towards the side corresponding to the first chain-ring; and/or c) the first tooth of the up-shift segment is recessed in its side opposite to the first chain-ring, such that a surface for guiding the chain to the engaged configuration is defined.

2. The chain-rings set according to claim 1, wherein the support parts of the independent segments are supported by the support part of the first chain-ring.

3. The chain-rings set according to claim 1, wherein the chain-rings are angularly displaced such that, in a starting configuration for shifting from the first chain-ring to the second chain-ring and in tensed chain conditions in the up-shift section of the chain which is the section of tensed chain between both:

a last tooth of the first chain-ring is engaged in the up-shift section of the chain, with an engaged chain-link of this up-shift section of the chain such that a front flank of the last tooth of the first chain-ring contacts an engaged roller of the engaged chain-link of the up-shift section of the chain; and a first tooth of the up-shift segment is engaged in the up-shift section of the chain, with an engagement chain-link of this up-shift section of the chain such that a front flank of the first tooth of the up-shift segment contacts an engagement roller of the engagement chain-link of the up-shift section of the chain.

4. The chain-rings set according to claim 1, wherein the second chain-ring has four more teeth than the first chain-ring.

5. The chain-rings set according to claim 1, wherein one or more teeth immediately subsequent in the engagement to the first tooth of the up-shift segment are cut down in their side opposite to the first chain-ring, such that surfaces for progressively guiding the chain to the engaged configuration are defined.

6. The chain-rings set according to claim 3, wherein the last tooth of the first chain-ring which is completely engaged with the engaged chain-link of the up-shift section of the chain, and/or any tooth subsequent which is partially engaged with a link of the up-shift section of the chain in the configuration for shifting from the first chain-ring to the second chain-ring is displaced with respect to the medium plane of the support part of the first chain-ring and in the side corresponding to the second chain-ring.

7. The chain-rings set according to claim 1, in which the last tooth of the first chain-ring and/or any tooth subsequent in the engagement, is recessed in its side opposite to the second chain-ring.

8. The chain-rings set according to claim 1, wherein a down-shift segment of the segments has a last tooth which is the last tooth engaging with the chain in the rotation movement in the second chain-ring, wherein the displacement means are configured for simultaneously:

take a complementary segment out of the engaging position and bring the up-shift segment to a configuration wherein the last tooth of the up-shift segment is engaged with an engaged chain-link of the down-shift section of the chain, an engagement chain-link of the down-shift section of the chain, is engaged in the first tooth of the first chain-ring and without the support part of the down-shift segment reaching the same plane than the support part of the first chain-ring.

9. The chain-rings set according to claim 8, wherein the first link subsequent in the engagement to the engaged chain-link of the down-shift section wherein a seating area is higher than the 50% of a complete seating area when the engaging roller of the down-shift section contacts a front flank of the first tooth of the first chain-ring in a configuration for shifting from the second chain-ring to the first chain-ring, the so-called centering link, is a wide link.

10. The chain-rings set according to claim 8, wherein the chain-rings are angularly displaced such that, in a starting configuration for shifting from the second chain-ring to the first chain-ring and in tensed chain conditions in the down-shift section of the chain:

the last tooth of the down-shift segment, is engaged in the down-shift section, with the engaged chain-link of this down-shift section of the chain such that a front flank of the last tooth of the down-shift segment contacts the engaged roller of the engaged chain-link of the down-shift section of the chain; and the first tooth of the first chain-ring is engaged in the down-shift section of the chain, with the engagement chain-link of this down-shift section of the chain such that the front flank of the first tooth of the first chain-ring contacts the engagement roller of the engagement chain-link of the down-shift section of the chain.

11. The chain-rings set according to claim 8, wherein a centering tooth corresponding to the centering link has its tip displaced with respect to the medium plane of the support part of the first chain-ring in the side corresponding to the second chain-ring.

12. The chain-rings set according to claim 11, wherein the centering tooth is recessed in its side opposite to the second chain-ring, such that a surface for guiding the chain to the engaged configuration is defined.

13. The chain-rings set according to claim 12, wherein one or more teeth immediately subsequent in the engagement to the centering tooth are cut down in their side opposite to the second chain-ring, such that surfaces for progressively guiding the chain (3) to the engaged configuration are defined.

14. The chain-rings set according to claim 13, wherein the first teeth of the complementary segment are cut down in the side of the first chain-ring to avoid the engagement of the chain in this complementary segment in a configuration for shifting from the second chain-ring to the first chain-ring and create a surface for guiding the chain towards the engaging plane in the first chain-ring is defined.

15. The chain-rings set according to claim 8, wherein the last tooth of the down-shift segment and/or the previous ones have their tip displaced with respect to the medium plane of the support part of the down-shift segment in the side corresponding to the first chain-ring.

16. The chain-rings set according to claim 8, wherein the last tooth of the down-shift segment and/or the previous ones are cut down in their side opposite to the first chain-ring, such that a surface for guiding the chain towards the engaging plane in the first chain-ring is defined.

17. The chain-rings set according to claim 1, wherein a segmentation cut of the down-shift segment prolongs a rear flank such that it does not interfere with a roller subsequent in the engagement to the engaged roller of the down-shift section of the chain in the position for shifting from the second chain-ring to the first chain-ring.

18. The chain-rings set according to claim 1, wherein the front flanks of the teeth prior in the engagement to the first tooth of the first chain-ring are cut down above of an engagement interval, wherein the force transmission between the chain-ring and the chain in the non-shifting position is produced, so as not to interfere with the rollers of the down-shift section of the chain subsequent to the engaged roller of the down-shift section of the chain and prior to the engagement roller of the down-shift section of the chain in the position for shifting from the second chain-ring to the first chain-ring.

19. The chain-rings set according to claim 1, wherein an interference tooth having a partial engagement lesser than 50%, has its height reduced with an oblique cut, aimed at avoiding interference with the chain in the shifting processes from the first chain-ring to the second chain-ring or from the second chain-ring to the first chain-ring.

20. The chain-rings set according to claim 19, wherein the interfering tooth and adjacent have an over-thickness towards at least one side.

21. The chain-rings set according to claim 1, wherein the teeth not involved in the shifting process, coinciding with wide links of the chain, have an over-thickness towards at least one side.

22. The chain-rings set according to claim 1, wherein the second chain-ring has cavities for housing the teeth of the first chain-ring having over-thickness towards the side of the second chain-ring.

23. The chain-rings set according to claim 1, wherein the last tooth of the down-shift segment and/or any of the previous teeth to the first tooth of the up-shift segment have a recess in the rear flank so as not to interfere with the rollers of the chain in the moment of unseating of the chain from the chain-ring during the shifting phase.

24. The chain-rings set according to claim 1, wherein the first chain-ring and/or the second chain-ring are circular or have a variable radius.

25. Chain-rings set according to claim 1, wherein the up-shift segment and the down-shift segment are the same shifting segment.

26. The chain-rings set according to claim 1, wherein an external envelop line of the first chain-ring is located at a minimum distance from a baseline of the second chain-ring, this minimum distance being the difference between the roller radius and the radius of the outer circular contour of the link.

27. Bicycle comprising a chain-rings set, which comprises a chain, a first chain-ring, a second chain-ring having a common axis with the first chain-ring and provided with more teeth than the first chain-ring, wherein the first chain-ring is formed by a support part of the teeth and a teeth part, wherein the second chain-ring is formed by segments each formed by a support part of the teeth and a teeth part, which comprises axial displacement means of the segments such that they can be moved in an independent manner at least in the direction of the common axis, wherein an up-shift segment of the segments has a first tooth which is the first which is engaged with the chain in the rotation movement;
wherein the teeth of the second chain-ring define valleys between the teeth and wherein the second chain-ring defines a base line passing through the lowest points of the valleys between the teeth of the second chain-ring; in each segment of the segments, the base line separating the teeth part of the segment from the support part of the teeth of the segment;
the displacement means being configured for moving the up-shift segment to an engaging position such that the first tooth can engage with an engaging link of the up-shift section of the chain, when the chain is engaged in the first chain-ring, and without the support part of the up-shift segment reaching the same plane than the support part of the first chain-ring;
the displacement means being configured for successively moving remaining segments to an engaging position with the chain without the support parts of the segments reaching the same plane than the support part of the first chain-ring; and
a) the first chain-ring and the second chain-ring having an even number of teeth and wherein the engagement chain-link of the up-shift section of the chain is a wide link; and/or
b) the first tooth of the up-shift segment has its tip displaced with respect to the medium plane of the support part of the up-shift segment towards the side corresponding to the first chain-ring; and/or
c) the first tooth of the up-shift segment is recessed in its side opposite to the first chain-ring, such that a surface for guiding the chain to the engaged configuration is defined.

28. Chain-rings set, for a power transmission system, which comprises a chain, a first chain-ring, a second chain-ring having a common axis with the first chain-ring and provided with more teeth than the first chain-ring, wherein the first chain-ring is formed by a support part of the teeth and a teeth part, wherein the second chain-ring is formed by segments each formed by a support part of the teeth and a teeth part which comprises axial displacement means of the segments such that they can be moved in an independent manner at least in the direction of the common axis, wherein an up-shift segment of the segments has a first tooth which is the first which is engaged with the chain in the rotation movement;
   wherein the teeth of the second chain-ring define valleys between the teeth and wherein the second chain-ring defines a base line passing through the lowest points of the valleys between the teeth of the second chain-ring; in each segment of the segments, the base line separating the teeth part of the segment from the support part of the teeth of the segment;
   the displacement means being configured for moving the up-shift segment to an engaging position such that the first tooth can engage with an engaging link of the up-shift section of the chain, when the chain is engaged in the first chain-ring, and without the support part of the up-shift segment reaching the same plane than the support part of the first chain-ring;
   the displacement means being configured for successively moving remaining segments to an engaging position with the chain without the support parts of the segments reaching the same plane than the support part of the first chain-ring;
   the first chain-ring and the second chain-ring having an even number of teeth and wherein the engagement chain-link of the up-shift section of the chain is a wide link;
   the first tooth of the up-shift segment has its tip displaced with respect to the medium plane of the support part of the up-shift segment towards the side corresponding to the first chain-ring; and
   the first tooth of the up-shift segment is recessed in its side opposite to the first chain-ring, such that a surface for guiding the chain to the engaged configuration is defined.

\* \* \* \* \*